(12) United States Patent
Yost et al.

(10) Patent No.: US 11,680,001 B2
(45) Date of Patent: Jun. 20, 2023

(54) SYSTEMS AND METHODS FOR TREATING ACIDITY, HEAVY METALS, AND SOLIDS IN ACID MINE DRAINAGE AND OTHER AQUEOUS FLUIDS

(71) Applicants: Karl William Yost, Anacortes, WA (US); Richard W. Alexander, Lebanon, OR (US)

(72) Inventors: Karl William Yost, Anacortes, WA (US); Richard W. Alexander, Lebanon, OR (US)

(73) Assignee: Yost Brothers LLC, Anacortes, WA (US)

( * ) Notice: Subject to any disclaimer, the term of this patent is extended or adjusted under 35 U.S.C. 154(b) by 0 days.

(21) Appl. No.: 16/355,582

(22) Filed: Mar. 15, 2019

(65) Prior Publication Data

US 2019/0284073 A1    Sep. 19, 2019

Related U.S. Application Data

(60) Provisional application No. 62/643,562, filed on Mar. 15, 2018.

(51) Int. Cl.
*C02F 9/00* (2023.01)
*C02F 103/10* (2006.01)
(Continued)

(52) U.S. Cl.
CPC .......... *C02F 9/00* (2013.01); *C02F 2101/103* (2013.01); *C02F 2101/203* (2013.01);
(Continued)

(58) Field of Classification Search
CPC ........ C02F 9/00; C02F 2101/22; C02F 1/463; C02F 2101/103; C02F 2103/10;
(Continued)

(56) References Cited

U.S. PATENT DOCUMENTS

| 2010/0140107 A1* | 6/2010 | Sloan | C25B 1/26 |
| | | | 205/751 |
| 2013/0118994 A1 | 5/2013 | Altman | |
| 2017/0081227 A1* | 3/2017 | Riffe | C02F 9/00 |

FOREIGN PATENT DOCUMENTS

| CN | 101774715 | | 7/2010 | |
| CN | 103232095 A | * | 8/2013 | C02F 1/46 |

(Continued)

OTHER PUBLICATIONS

KR-20080040659-A; inventor: Yoo Hyo Suk; country KR English abstract (Year: 2008).*

(Continued)

*Primary Examiner* — Walter D. Griffin
*Assistant Examiner* — Cameron J Allen
(74) *Attorney, Agent, or Firm* — Perkins Coie LLP

(57) ABSTRACT

Devices and associated methods described herein in accordance with embodiments of the present technology can, for example, treat acidity and remove suspended solids and heavy metals from acid mine and acid rock drainage, as well as from other acidic and various aqueous fluids of various pH. The disclosed system includes a cavitation/electrocoagulation reaction chamber, solids separation, and other optional components including a passive media contact reaction chamber, and/or an oxidation/reduction electrode assembly to facilitate or expand upon parameters requiring treatment. The disclosed system can be packaged in small housing units suitable for insertion within mine tunnels or adits, but may also be expanded for large scale applications.

18 Claims, 15 Drawing Sheets

(51) Int. Cl.
*C02F 103/16* (2006.01)
*C02F 101/20* (2006.01)
*C02F 101/22* (2006.01)
*C02F 101/10* (2006.01)

(52) U.S. Cl.
CPC .... *C02F 2101/206* (2013.01); *C02F 2101/22* (2013.01); *C02F 2103/10* (2013.01); *C02F 2103/16* (2013.01); *C02F 2201/46105* (2013.01)

(58) Field of Classification Search
CPC .............. C02F 2101/36; C02F 2101/20; C02F 2101/203; C02F 2103/16; C02F 2201/46105; C02F 1/34; C02F 1/467; C02F 1/36; C02F 2103/06; C02F 2101/206
See application file for complete search history.

(56) References Cited

FOREIGN PATENT DOCUMENTS

| | | | | |
|---|---|---|---|---|
| CN | 107215940 A | * | 9/2017 | ................ C02F 1/62 |
| DE | 102015006706 | | 11/2016 | |
| KR | 20080040659 A | * | 5/2008 | |
| WO | WO-2008150541 A1 | * | 12/2008 | .............. C02F 1/325 |
| WO | WO-2012112029 A1 | * | 8/2012 | ................ C02F 1/36 |

OTHER PUBLICATIONS

International Search Report and Written Opinion for PCT/US2019/022622 filed on Mar. 15, 2019, dated Jun. 13, 2019, 6 pages.

* cited by examiner

SYSTEMS AND METHODS FOR TREATING ACIDITY, HEAVY METALS, AND SOLIDS IN ACID MINE DRAINAGE AND OTHER AQUEOUS FLUIDS

CROSS-REFERENCE TO RELATED APPLICATION

This application claims priority to U.S. Provisional Patent Application No. 62/643,562, titled "SYSTEMS AND METHODS FOR TREATING ACIDITY, HEAVY METALS, AND SOLIDS IN ACID MINE DRAINAGE," filed Mar. 15, 2018, which is incorporated herein by reference in its entirety.

This application is related to U.S. Non-Provisional patent application Ser. No. 16/167,347, now U.S. Pat. No. 11,059,008, titled "REVOLVING CHAMBER OSCILLATION MIXING DEVICE AND ASSOCIATED METHODS," filed on Oct. 22, 2018, which is incorporated herein by reference in its entirety.

TECHNICAL FIELD

The present technology generally relates to devices and methods to treat water, aqueous fluids, and brines containing acidity, heavy metals, suspended solids, other constituents, and electrolytes via electric power with components of various geometries and combinations of cavitation coupled with electrolytic variations that implement sacrificial and/or dimensionally stable electrodes in system(s') integration with hydro-electric power generation.

BACKGROUND

Acidic fluids that contain heavy metals are leading contributors to adverse water quality that impacts human health and the environment. By chemical nature, acidity tends to keep heavy metals in dissolved ionic states conducive to adverse chronic and acute toxicity effects on aquatic and human health due to exposure, bioaccumulation and subsequent transfer up the food chain. Prevalent acidic fluids containing heavy metals that are problematic for these reasons include Acid Mine Drainage/Acid Rock Drainage (AMD/ARD) and fluids generated by heavy metal plating activities. While not alone in their acidic and heavy metal characteristics and pollution causing presence and persistence, these two examples are sources that contribute heavy metal loading to other non-desired receptors.

AMD is a significant on-going source of heavy metal and acidity loading to downstream waters. When metal-sulfide ore is extracted from mines, un-mined ore, low-grade ore and ore residuals that remain in mines or at former mine sites are often exposed to water, oxygen in air or water, and bacteria. In these conditions, sulfide in pyrite and other such pyrrohtic minerals is oxidized through a series of reactions form sulfate, and acidity caused by sulfuric acid is generated. These acidic conditions also facilitate the dissolution and mobilization of dissolved heavy metals, and as acidic conditions continue to be created, additional sulfide-bearing mineral materials are further degraded in similar fashion. In mountainous areas where mining is common due to metal-ore formations, snow-melt and other precipitation events as well as ground-water, all can intrude into exploited mine voids. As water levels fluctuate with precipitation, diurnal, and seasonal cycles; water intrusion facilitates AMD generation, metal precipitation-dissolution on exposed and then submerged surfaces, accumulation in mine pools and subsequent egress from the mine tunnels/adits, and/or seeps and mining caused rock fractures.

Metal plating operations also generate acidic fluid that contains heavy metals. While these fluids do not necessarily carry the full array of dissolved mineral constituents derived during AMD formation from rock or earthen sources, they do have extremely high concentrations of heavy metals and low pH. Plating fluids typically do not contain a broad spectrum of metals as AMD in that plating operations purposely limit metals to those being needed for any given plating operation to assure high quality results. These fluids require pretreatment or full-treatment prior to permitted discharge to sanitary sewers and navigable and/or other waters protected by law.

Historically, treatment of acidic fluids that carry heavy metals and other constituents has involved the formation of metallic hydroxides that are fairly insoluble in alkaline pH, often in the range of 9-11.5 S.U. This is still commonly accomplished using pH adjustment provided by lime and its various forms, caustic soda, or other alkaline provided reagent additives. These and other precipitation/coagulation agents also contribute calcium, hydrated water, and/or other flocculation aids into the resultant solid mass that precipitates and is settled out to create clarified water. Further, review of well-known pH-heavy metal solubility curves shows that some metals precipitate in weakly alkaline conditions, and others at a higher pH. Water treatment systems then implement a best target pH point to achieve removal of as many metals as possible to their respective lowest concentration achievable at that pH. Unfortunately, aqueous streams that contain multiple metals treated in this manner still carry metals not fully insoluble at the practiced pH point. When required, additional treatment steps are implemented that may include another pH point treatment after previous solids removal. For various flow volumes, broad-spectrum heavy metal diversity, and/or extremely elevated heavy metal concentrations, this treatment approach is a very difficult, costly and impractical to implement.

To address these issues researchers have looked at many types of innovative water approaches with laboratory and field trials that include zero-valent iron, sono-chemistry, electrocoagulation, ion-exchange, microwave, UV, and other such technologies to overcome the performance and practical application limitations of alkaline heavy metal co-precipitation. The benefits of combining some of these have proven effective at removing some heavy metals using a treatment train of technologies including some form of pH adjusting additives or buffering agents, ZVI, sono-chemistry, or other combinations are published in research literature.

However, where combined, these technologies have been tested and evaluated on synthesized acidic fluids made from laboratory grade reagents, small quantities of site source water, or from plating operations where constituents in the fluid are much less diverse than those in the acidic fluids containing metals and other mineralized materials. Further, researchers typically identify slow production rates, high energy costs, fouling, scaling, and other deleterious conditions and results that limit treatment of such fluids using the combined technologies to batch volumes.

Accordingly, a need exists for water treatment systems and processes that overcome some or all of the above described problems experienced by previously known methods and systems.

SUMMARY

Described herein are various embodiments of systems and methods for treating acidity, heavy metals, and solids in acid mine drainage and other aqueous fluids that also carry highly stable persistent organic compounds.

The technology described herein combines four technologies that have not previously been combined for the purpose of generating appropriately treated water on a continuous flow basis. The system of combined components does not require the addition of conventional water treatment chemicals. Rather, the system described herein relies on fluid dynamics and electricity to treat AMD and plating fluids that contain high levels of acidity, dissolved heavy metals, and other recalcitrant constituents. These four technologies include: 1) stationary or moving media, and/or catalyst within a flowing aqueous stream; 2) two types of distinct, but separate, cavitation applied concomitantly with 3) electrocoagulation where all can be applied in the same reaction chamber; and 4) an electrolytic oxidation/reduction cell using dimensionally stable electrodes. Each component of the disclosed system provides various mutual or shared benefits to the other component technologies, but also serve to treat acidity and remove heavy metals from these problematic waters.

Where the described system does consume sacrificial materials such as iron or aluminum, these materials can be provided as salvage scrap in some instances, but primarily, the carbon footprint is greatly reduced where iron and aluminum manufacture, even from raw ore materials, generates much less carbon dioxide per useful pound of metal, than a pound of limestone used to make alkaline reagents such as quicklime. Importantly, components of the discloses system are self-cleaning, form resultant solids of low mass and volume relative to conventional treatment system solids such as lime-based high calcium content materials, and can be installed where it will generate its own power for operation. Without inclusion of calcium or other bulking additives, resultant solids contain high concentrations of metals that may be suitable for heavy metal recovery, including rare-earth species. As such, the system described herein is especially well suited for applications at remote mountainous AMD source sites that continuously generate impactful AMD.

Embodiments of the technology described herein are capable of neutralizing, i.e., treating acidity in fluids, removing suspended solids, certain dissolved solids and electrolytes, and heavy metals, and/or altering other constituents and properties of the fluid stream using fluid dynamics and electricity as primary treatment mechanisms.

The technology described herein is suitable for the treatment of Acid Mine/Acid Rock Drainage (AMD/ARD) in remote mountainous regions, or where hydraulic water head pressure can be used to generate electric power. While suited for ARD and/or AMD, the flexibility of the technology described herein accommodates treatment of any aqueous fluid that contains adequate electrolytes, acidity, suspended solids, heavy metals, various inorganic ions and organic compounds, and/or bacteria and other pathogens found in sanitary, manufacturing facility, impacted groundwater, surface water run-off, and other sources of impacted aqueous fluids and wastewater as a pre-treatment or full-treatment approach to water quality objectives.

In some embodiments, treated or untreated fluid can be used to generate electricity through a penstock, turbine and generator to offset treatment system power requirements, and/or provide excess power beyond demand of the treatment system and ancillary support features.

Concomitant application of both cavitation and electrocoagulation in the systems and methods described herein can provide multiple benefits. The technology described herein integrates principles of two types of cavitation and electrocoagulation within a single chamber, with mixing and solids separation from the processed fluid provided in the device containing the chamber, or in a separate component that is part of the disclosed technology. In other preferred treatment system embodiments, processes include a reaction chamber where water intimately contacts and mixes with a select stationary or active in-motion reactive media within that may include a device to mix fluid with a solid media in a batch, continuous, or variable fluid flow mode of operation by the induced multidirectional and tri-axial movements of fluid and solids media within the mixing compartments. Various embodiments for carrying out fluid treatment according to the technology described herein may include magnetic alignment and separation, electrolytic and/or catalytic oxidation, flow-through sinusoidal mixing and reacting, and hydropower generation options. While embodied, but not necessarily preferred, the technology described herein is well suited for incorporating dosed delivery of supplemental water treatment reagents and chemicals using conventional chemical feed pump mechanisms with mixing and reaction of the additives with water and its carried constituents as a function provided by system's equipment. The technology facilitates chemical reactions and physical interactions that cause treatment of contaminants hosted in source water and where some contaminants in host water may be altered by the technology described herein to become reactants that provide added benefits for the overall effective water treatment. For example, sulfate within AMD can be converted to sulfide or persulfate, bicarbonate to carbonate, and Iron (II) to Fe (III) where these created beneficial reactants enhance overall technology reactions. Expanding on the sulfate example that is contained in untreated AMD, the technology disclosed herein can create sulfides that will react with metals in AMD to form highly insoluble metal-sulfides, and in another mode, create persulfate that can convert highly soluble Iron (II) in AMD to less soluble more reactive Iron (III).

BRIEF DESCRIPTION OF THE DRAWINGS

Non-limiting and non-exhaustive embodiments of the disclosed system and methods, including the preferred embodiments, are described with reference to the following figures, wherein like reference numerals refer to like parts throughout the various views unless otherwise specified.

DETAILED DESCRIPTION

Figure 1A:
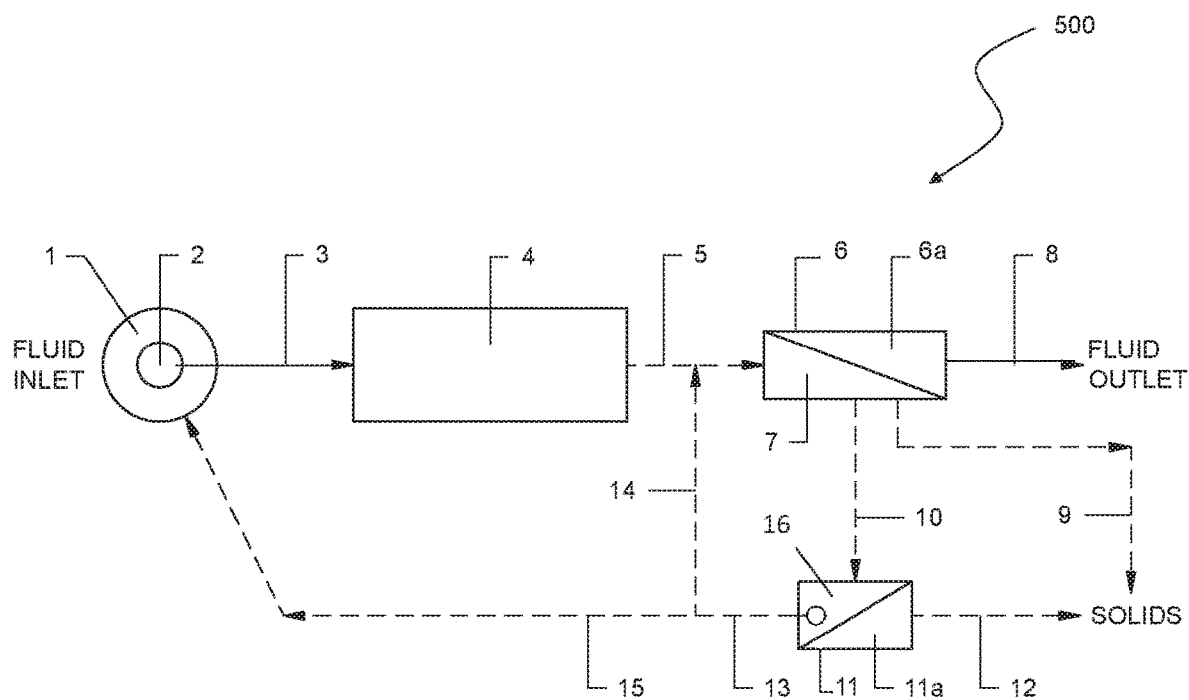
FIGS. 1A-1D are schematic illustrations depicting a water treatment system according to various embodiments described herein

Many aspects of the present technology can be better understood with reference to the following drawings. The components in the drawings are not necessarily to scale, nor do they represent all the various and possible sequences or permutations of the technology components. Instead, emphasis is placed on illustrating clearly the principles of the present technology.

Not shown in the figures or emphasized in this disclosure are readily available off-the-shelf process monitoring and control, or yet to be developed technologies for monitoring equipment, instruments, sensors, and data logic management and process control system packages that are incorporated into the technology to facilitate desired treatment system operation and performance. While not specifically identified, parameters to be monitored to effect process control, several locations for possible installation of monitoring and control devices within the process equipment are indicated. These are not comprehensive and any lack of monitoring or control parameter, set-point limit(s), actuated or triggered function, or location not identified, or called out within this disclosure does not limit the extent of the disclosed technology with respect to its treatment abilities or performance objective related to water quality.

Component sequencing, sizes and dimensions, and overall capacity determinations require treatability studies, and possible field trials on fluids for treatment to gather data often necessary for engineering final system designs to accommodate specific characteristics of the aqueous fluid to be processed and treated, the spatial orientation demands posed by specific installation locations, and the desired aqueous quality of the treated/processed aqueous fluid. Components readily available vs. those that require custom fabrication and/or manufacture may put limits on size and configuration and could cause a parallel subsystem or parallel component alignment requirement within a comprehensive system. As such, the present disclosure focuses on the technology components of treatment, but also includes component variations and quantities that may be provided for a given installation without detracting or diverging from the disclosed art.

FIGS. 1A, 1B, 1C, and 1D depict generalized schematics of various embodiments of the water treatment system 500 described herein. FIG. 1A shows an embodiment of system 500 wherein the primary components include: a water source/feed pump; a cavitation/electro-coagulation (Cav/EC) reactor; a solids separation process step; and a fluid outlet for discharge or conveyance to subsequent fluid processing or handling. FIGS. 1B, 1C, 1D, and 1E illustrate embodiments of the system 500 that include additional components, such as: mechanical cavitation nozzles(s); acoustic ultrasonic cavitation; media contact reactor; an oxidation/reduction electrolytic cell; and solids dewatering process step components.

With specific reference to FIG. 1A, a basic embodiment of a water treatment system 500 is illustrated. Water from source 1 is pumped via pump 2 through inlet piping 3 to deliver water to and through the cavitation/electrocoagulation (Cav/EC) reactor 4. Water exits at the Cav/EC reactor 4 and is transported to subsequent components of the system 500 via piping 5. Processed water from the Cav/EC reactor enters a solids maturation and/or separation unit 6 so that water 6a separated from contaminant-carrying solids may be conveyed via piping 8 downstream to another system component for further treatment, re-use, recycling, or discharge. Solids 7 separated from the treated water 6a may then be subsequently transferred via piping 10 to a subsequent dewatering unit 11 where solids 11a are conveyed via piping 12 for subsequent management, and fluid 16a from dewatering unit 11 are transported via piping 13 to piping 14, which returns the water to the separation unit 6 and/or piping 15, which returns the water to the source 1.

Figure 1B:
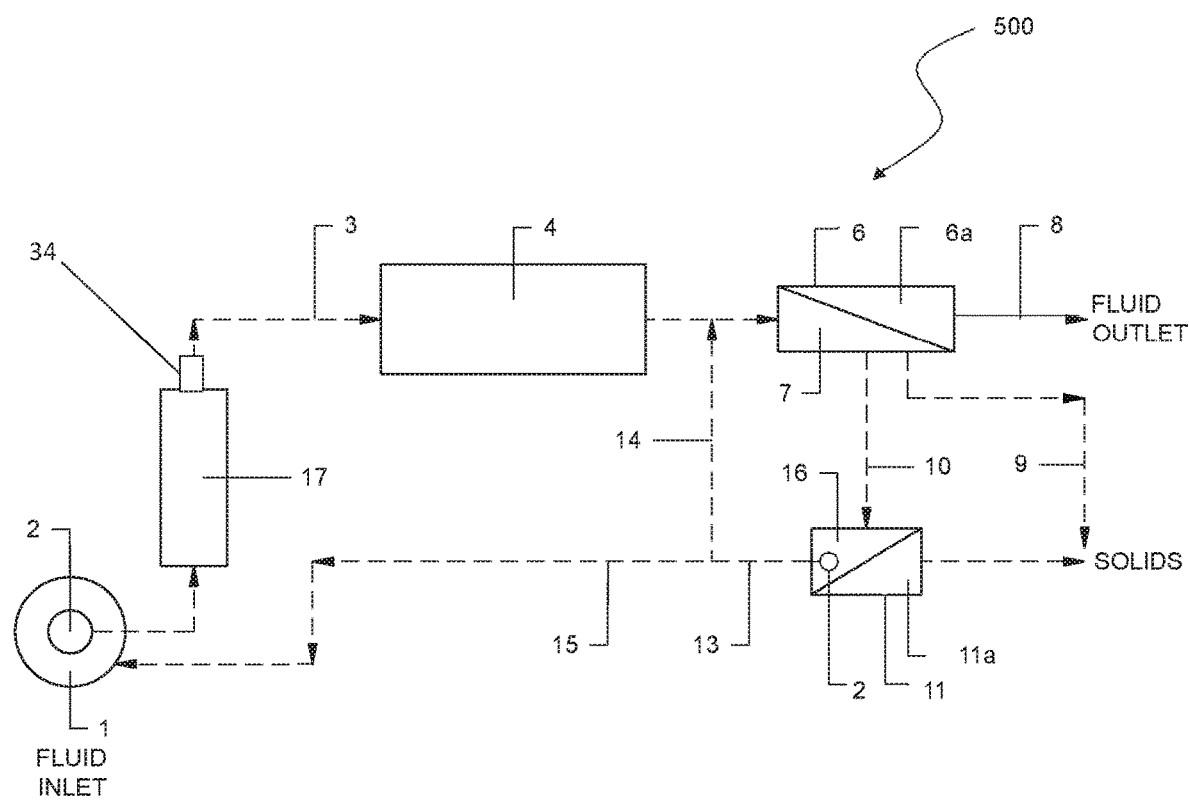
Figure 1C:
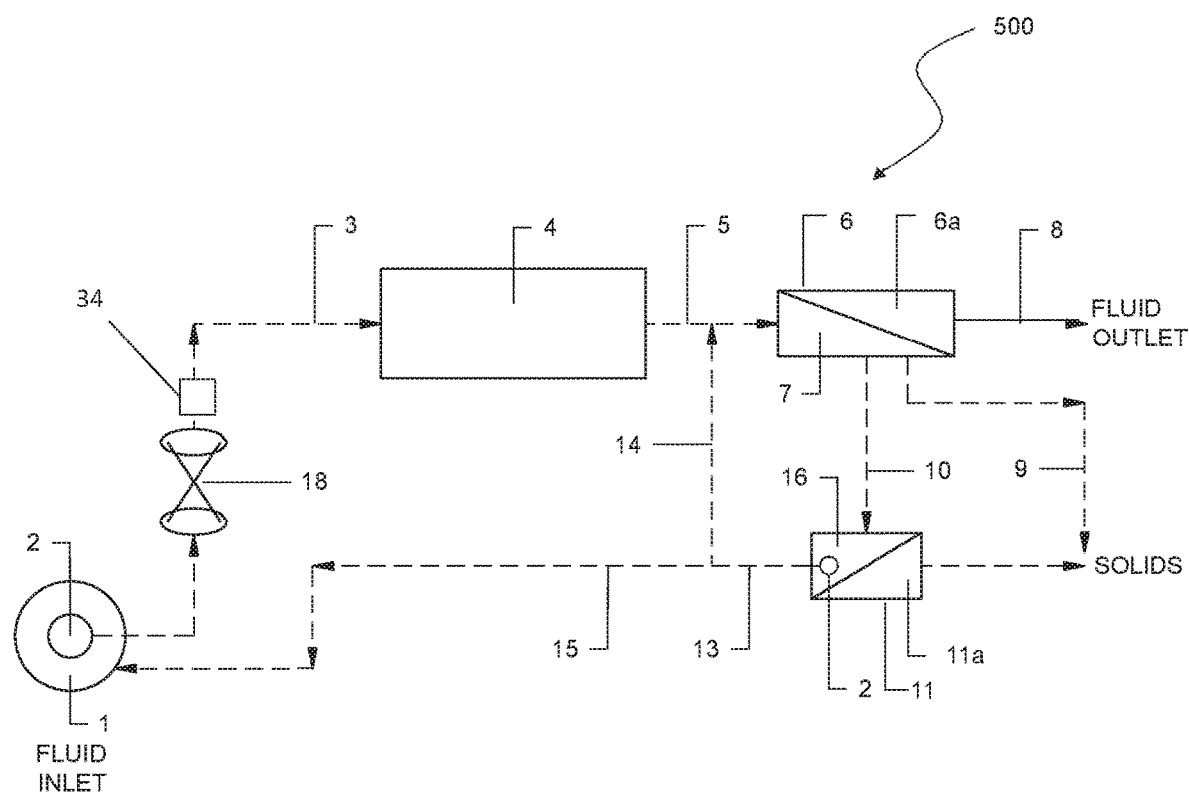
Figure 1D:
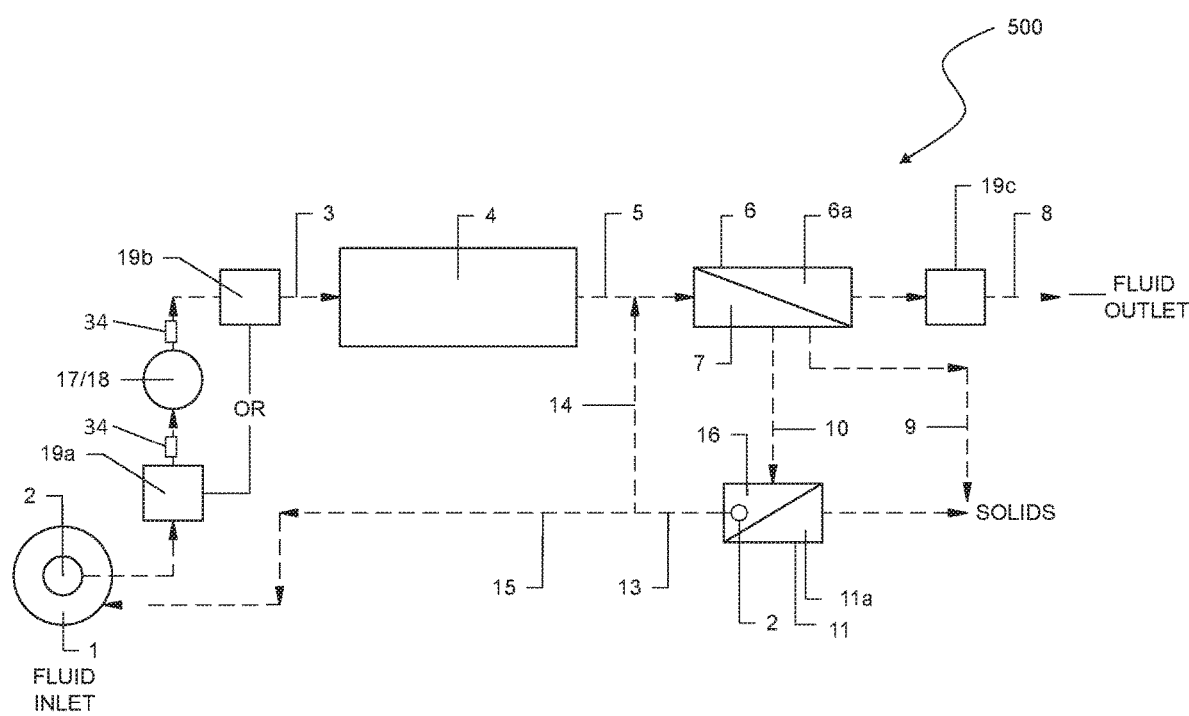

FIG. 1B presents a similar water treatment system 500 as depicted in FIG. 1A, but where a flow-through reactive stationary-media reactor 17 is inserted in-line between the source 1 and the Cav/EC reactor 4. FIG. 1C is another similar embodiment, but where the stationary media chamber 17 is replaced with a reactive moving-media reactor 18. FIG. 1D is yet another similar embodiment, but where oxidation/reduction electrolytic cells (OREC) 19a, 19b, and/or 19c are inserted within the system 500 at locations that best facilitate fluid treatment to its desired outlet quality. As shown in FIG. 1D, either stationary media chamber 17 or reactive moving chamber 18 may be used in the system 500. As with other components of the system herein disclosed, a single OREC or a plurality of OREC units may be installed in parallel or sequentially to each other at any desired location within the system. FIG. 1D illustrates three (3) optional placement locations. Further, the OREC, as discussed elsewhere in this disclosure, may be configured and operated to provide oxidation or reduction influences on water and its carried constituents either included in the source 1 water, created by the system disclosed herein and its components singularly or collectively, provided as supplement, or those that arise from derived reactions.

Other system component configurations than those presented in FIGS. 1A, 1B, 1C, and 1D that are consistent with the applied use of cavitation, electrocoagulation, and oxidation/reduction technology can also be used such that acidity, suspended solids, heavy metals, some dissolved solids, and solids separation affect desirable treatment of impacted aqueous fluids. Further, additional components may be added to the system configurations shown in FIGS. 1A-1D, including but not limited to: magnetic separation and alignment; reactive catalysts; impactful in-line filtration; cavitation mixing, erosion, corrosion, mixing, intentional in-line obstacle free mixing and reacting components, other solid separation components, and derived solids dewatering system components.

Figure 2A:
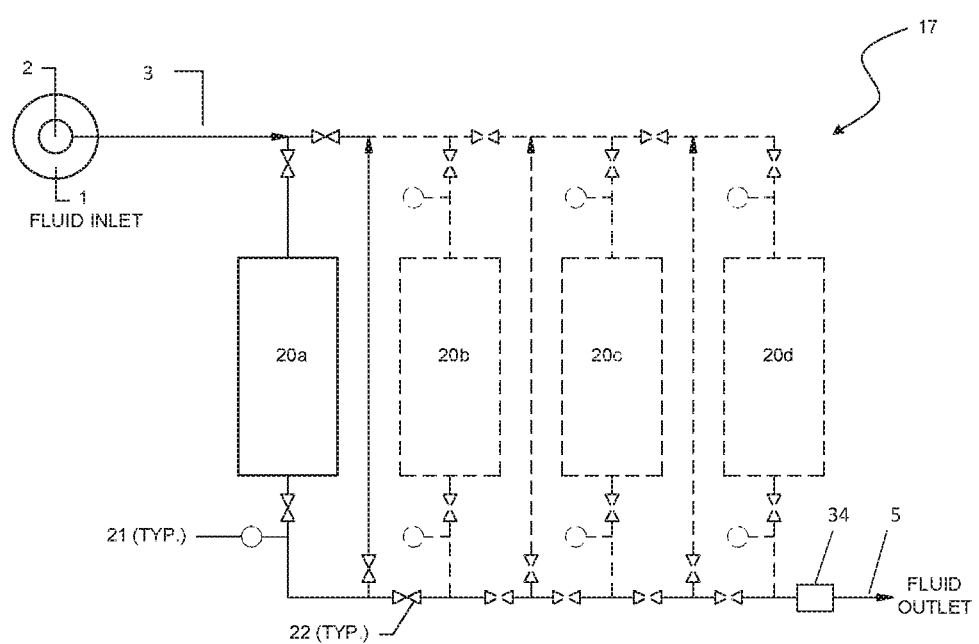
FIGS. 2A-2C are schematic illustrations depicting various embodiments of a reactive media chamber suitable for use in the water treatment system described herein.
Figure 2B:
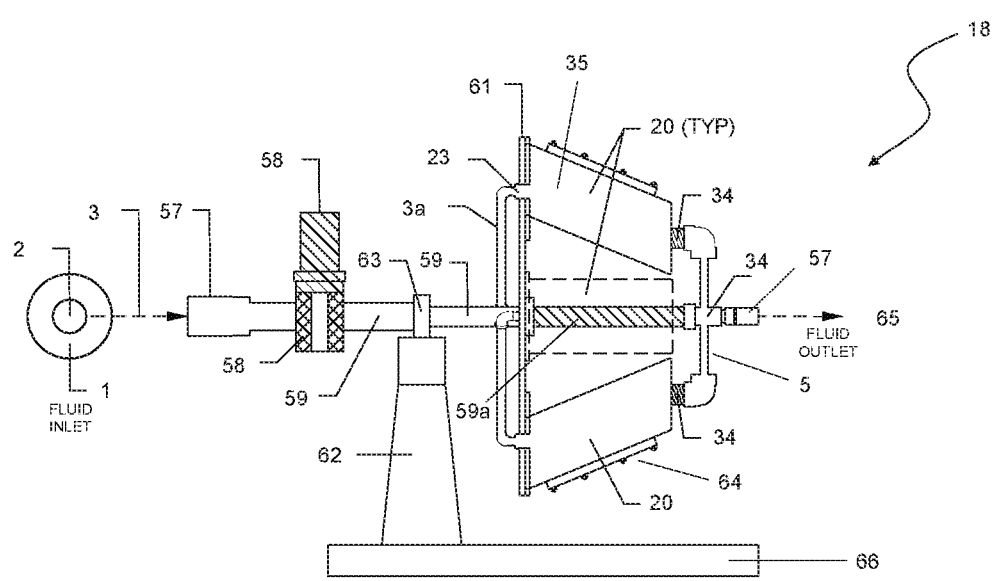
Figure 2C:
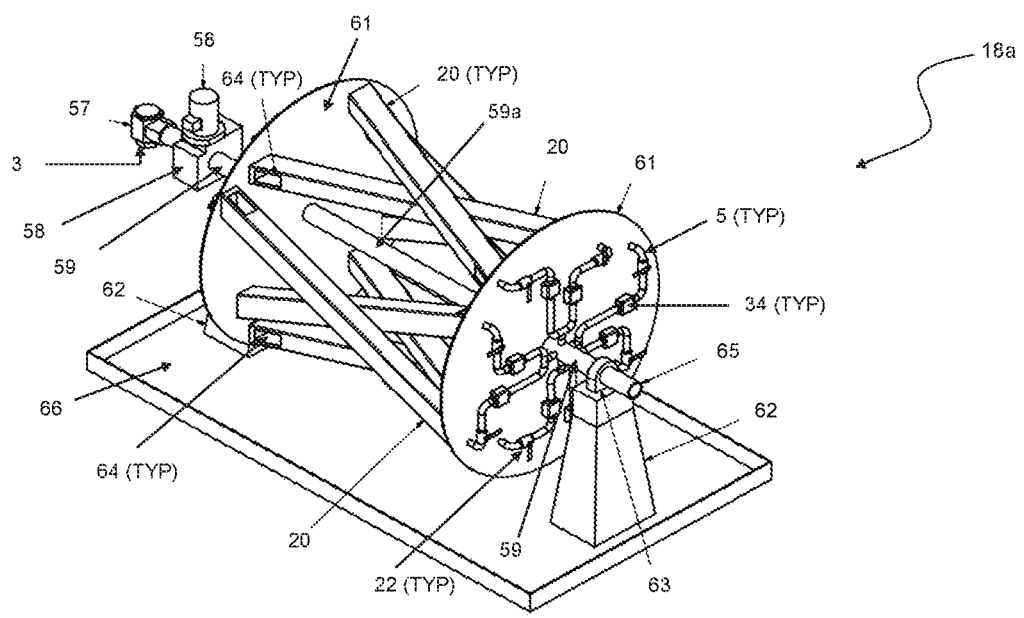

With reference now to FIGS. 2A, 2B, and 2C, additional detail on the media reactors suitable for use in the systems disclosed herein is provided. FIG. 2A illustrates one style of a stationary media chamber 17 suitable for use in the water treatment systems described herein. FIGS. 2B and 2C illustrate various styles of reactive moving chambers 18 suitable for use in the water treatment systems described herein. All of these device examples provide for the housing of a selectable reactive media and its intimate contact with water to affect treatment for various constituents hosted by the source water. FIG. 2A depicts a stationary media chamber 17 including a singular flow-through reactor 20a or plurality of contact reactors 20a, 20b, 20c, and 20d. In either configuration, water flows through stationary granular media mass contained within a column, tank, vault, bed, trench, or similar flow-through housing device that allows intimate contact with the media and the aqueous fluid. FIGS. 2B and 2C depict two separate embodiments of a reactive moving chamber 18 (i.e., mechanically active mixing contact media reactor) where the operational movement of the housing and its contained media facilitates enhanced contact and reaction between water, its constituents, and the media to achieve desired outcomes. In the moving media reactor examples shown in FIGS. 2B and 2C, flow-through tri-axial tumblers are presented. The tri-axial tumblers of FIGS. 2B and 2C may be similar or identical to the tri-axial tumblers discussed in greater detail in U.S. Non-Provisional patent application Ser. No. 16/167,347 (pending), the entirety of which is hereby incorporated by reference. The discussion and descriptions related to FIGS. 2B and 2C provided herein are general summaries and should not be treated as limiting when compared to the more detailed descriptions provided in U.S. Non-Provisional patent application Ser. No. 16/167,347.

Other media reactors of different design and/or geometry from what is shown in FIGS. 2A, 2B, and 2C may be also be used in the system described herein, provided that such other media reactors (whether stationary or moving) enhance media interaction with aqueous fluid and its constituents as sourced, provide catalytic or reactive supplements, and/or enhance cavitation and electrocoagulation performance and outcomes.

As illustrated in FIG. 2A, a single flow through reactor 20a provides for the contact of water and the contained reactive media in a stationary bed or column. Additional reactors 20b, 20c, 20d, etc. including, e.g., tanks, vessels, beds, trenches, columns, or the like, can be provided in a parallel configuration to expand treatment capacity and performance that may be needed for any given water. FIG. 2A shows piping options to allow for both parallel and serial reactor configurations.

With reference to FIG. 2A, source water 1 is pumped via pump 2 (or delivered under pressure from an upstream component) and delivered via inlet piping 3 to a series of flow through reactors 20a, 20b, 20c, 20d. A manifold system can be provided, together with one or more valves 22 to control flow, in order to distribute water to each of the flow through reactors 20a, 20b, 20c, 20d. As part of the overall stationary media chamber 17, process monitoring and control instrumentation, equipment, and sampling port conventions 21 are can be provided prior to and after each flow through reactor 20a, 20b, 20c, 20d. To retain and/or capture media for its further contribution to treatment, and/or to prevent downstream fouling, downstream capture components 34 (e.g., magnets, screens, in-line baskets, knock-out pots, or the like) can also be used in the disclosed system. In addition to providing extractive functions to the treatment of aqueous fluids, these capture/retention components 34 may also be used hold, retain, and position a granular or other solid catalyst that facilitates process reactions in a flow-through in-line manner. Magnets can enhance treatment performance by removing and retaining various small particles of, for example, zero-valent iron (ZVI) or other magnetic reaction residuals (magnetite). Further, magnetic fields have the potential to facilitate reaction chemistry via possible excitement of reactants and/or alignment of polar molecules in solution. A catalyst such as platinum may also be utilized to enhance reaction rates but is not sacrificed. These functional devices can be installed as needed and appropriate within or between the components of the described technology.

Processed water leaves the flow through reactors 20a, 20b, 20c, 20d, via fluid outlet 5 for subsequent processing, management, or discharge as monitored and controlled via process monitoring and control instrumentation (not shown on combined flow outlet).

FIGS. 2B and 2C illustrate various embodiments of reactive moving chambers 18 suitable for use in the system described herein and which are described in additional detail in U.S. Non-Provisional patent application Ser. No. 16/167,347. FIG. 2B depicts a single-plate reactive moving chamber 18 and FIG. 2C depicts a dual-plate reactive moving chamber 18 with purposeful provisions to accommodate increased flow rates, reaction and/or mixing retention time. Both devices impart robust dynamic tri-axial mixing of media material with fluids that are passed through the unit. In general, these units include a singular or plurality of media mixing reaction chambers fixed obliquely to a rotating end-plate or end-plates such that upon rotation of the plates, the chambers revolve around a central spindle causing end-to-end oscillations off the level horizontal rotating centerline of the devices. This imparted end-to-end oscillation couples with the polygonal cross-section of each chamber that causes further movement of the media within fluid flow due to gravity and the moving fall-line slope of the contained granular media as the chamber revolves 360°. While tumbling, water is feed into one end of the unit, passes through the actively moving media with intimate contact, and is then released from the other end. The rate of rotation of the spindle and end-plates, the amount of media, feed water flow rate, and the overall dimensional design geometry can be designed to accommodate processing and desired treatment results of this component and effects of entire treatment provided by the disclosed system.

With respect to both FIG. 2B and FIG. 2C, source water 1 is pumped via pump 2 (not shown in 2C) or otherwise delivered into the piping inlet 3 fixed to a hydraulic swivel 57. The swivel 57 allows for a water-tight connection between the inlet piping 3 to a rotating hollow spindle 59 that extends through a drive motor/transfer case 58. The motor/transfer case 58 causes rotation of the spindle 59 which is supported by a bearing or bearings 63 mounted to a pedestal or pedestals 62 within the footprint of a suitable base 66. The end of the hollow spindle 59 opposite the swivel 57 is fixed to the center point of the end-plate(s) 61 that rotate with the spindle 59 around the common horizontal axis. The hollow spindle 59 also provides for flow splitting and fitting attachment to inlet pipe or tubing 3a (not shown in FIG. 2C) to cavitation-causing jet nozzles 23 (not shown in FIG. 2C) that feed directly into individual flow-through reactors 20. In some embodiments and due to the intensity of the robust action of the flow through reactors 20, cavitation nozzles 35 can be optional where they would otherwise be focused on media that also becomes a target 35 (not shown in 2C) contained within the reactors 20.

The flow through reactors 20 are obliquely mounted to the end-plate or plates 61 and preferably have rectangular cross-sections. Positioning of the reactors 20 provides preferred structural strength and important balance of the unit during operation as the spindle 59 and plates 61 rotate and the affixed reactors 20 revolve around the common longitudinal axis. Physical balance and alignment is important to reduce energy required to rotate and operate the unit, and for its overall life-cycle longevity. Flow through reactors 20 release water via outlet piping 5 and a capture/retention component 34 prior to flowing into a fluid convergence fitting (not labeled), another swivel 57 (not shown on FIG. 2C), then to the fluid outlet 65. In the dual-plate unit in FIG. 2C, a solid-core spindle rod 59a is provided for structural stability of the unit, although a strong hollow spindle 59 may also be utilized with appropriate valve control if water flow through the device without passing through the reactors 20 is desirable. The capture component 34 may be optional, and/or alternatively positioned on or after the singular device outlet 65. A media service port 64 is present on each flow through reactor 20 to allow for inspection, unit cleaning, and media servicing.

FIGS. 3A, 3B, 3C, 3D, and 3E illustrate various configurations of the cavitation (Cav) and electrocoagulation (EC) components combined as an integrated Cav/EC reactor 4 suitable for use in the systems described herein. The figures show: fluid feed inlets; mechanical cavitation water jet nozzle(s); ultrasonic acoustic energy transducers; EC electrode pair and bundling configurations, various cell and reactor housing options; ultrasound and EC power supply; cavitation target plates; and fluid outlets, all of which integrate to enhance performance as a combined unit. The types of units presented in these figures represent exemplary embodiments. Other styles, geometries, and/or configurations of the units represented in these figures are also possible in disclosed systems where both cavitation and electrocoagulation are provided to benefit or derive benefit from other components of the system and process water in a combined reactor unit.

Figure 3A:
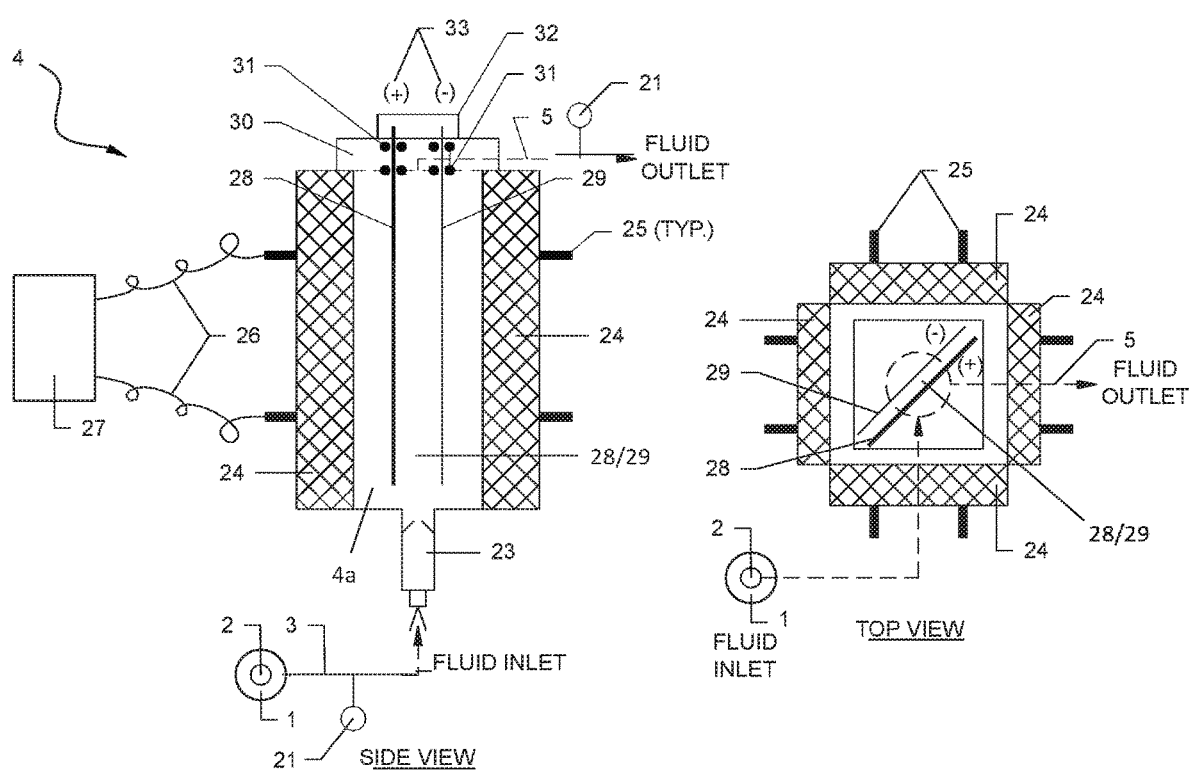
FIGS. 3A-3E are schematic illustrations depicting various embodiments of a combined cavitation/electrocoagulation (Cav/EC) reactor chamber suitable for use in the water treatment system described herein.

In a base embodiment, FIG. 3A provides a side view of a suitable Cav/EC reactor 4 where both cavitation and electrocoagulation are applied to water to be treated. Water from the source 1 or an upstream component of the system is pumped via pump 2 or delivered into the feed inlet 3 to the vertically aligned chamber 4a from below. This allows for gases that may be generated during operation of the reactor 4 to readily egress, as does water with the general up-flow of water as it is processed in the reactor 4. FIG. 3A includes a water jet nozzle 23 with its internal orifice, and core tapering and flaring geometry, that causes cavitation immediately as water departs the orifice constriction and enters the larger diameter of the nozzle 23 and then the chamber 4a of the Cav/EC reactor 4. The reactor 4 as shown is square in cross-section (see top view) for each rectangular (top to bottom) side wall to have an ultrasonic transducer array 24 affixed. The transducers 24 are externally mounted to the chamber 4a, with their respective energy emitting surfaces mounted appropriately to each of chamber wall exterior. Cavitation targets, such as electrodes 28/29, or material separate from the electrodes can be provided as in other important embodiments Not all walls may need to have transducers mounted as arrays or in other forms in some embodiments. Further, internally mounted fully submersible transducers may also be utilized with appropriate adjustments to the design of the Cav/EC reactor 4. In another embodiment, transducer horns, cones, or elongated cylindrical bars may also be utilized singularly or in a plurality, if the generation of cavitation bubbles and bubble swarms from the transducers adequately interact with electrocoagulation components and perform the desired function of cavitation. With both the fluid-dynamic jet nozzle and the acoustic ultrasonication-caused cavitation, both inertial and non-inertial cavitation types are created within the chamber concomitant with electrocoagulation provided by electrodes as a preferred embodiment.

With reference to FIG. 3A, ultrasonic transducer power connection terminals 25 are attached to power cables 26 that deliver DC power to the transducers 24. The transducers 24 contain arrays of piezoelectric cells that convert electric energy to mechanical energy that create rapid vibrations which project through the wall of the chamber 4a into the fluid within the submerged reaction Cav/EC reactor 4 where fluid is irradiated. The energy fields created by both the fluid-dynamics of the nozzle 23 and the ultrasonic acoustic energy from the arrays of transducers 24 create complexed cavitation for purposes and results as discussed in other sections of this disclosure.

In FIG. 3A, an EC anode 28 and cathode 29 make an electrode pair 28/29 that is positioned within the chamber 4a to receive focused ultrasonic energy from piezoelectric cell transducers 24 in the flooded chamber 4a. Flexible EC electrode positioning is possible to maximize targeted cavitation erosion as may be desired. The top view of the Cav/EC reactor chamber 4a shows the inserted electrode pair 28/29 rotated approximately 45° off perpendicular from the walls of the Cav/EC reactor 4 for enhanced exposure to acoustic cavitation energy from the transducers 24. This positioning also allows for maximized electrode surface area because of alignment across the diagonal hypotenuse of the chamber 4a square cross-section. In another embodiment not shown, the electrodes 28/29 may be mounted within the reaction chamber 4a such that they rotate mechanically through the cavitation field.

With respect to the electrocoagulation component of the Cav/EC reactor 4 of FIG. 3A, electrodes 28 and 29 are mounted in a removable water-tight cover 30 with gasket seals 31 provided to prevent leakage when seated and fixed on the reactor 4. The electrode ends are covered by a protective terminal box 32 within which wiring from the electrocoagulation DC power supply (not shown) is attached to terminals 33.

The untreated water inlet 3 and treated water outlet 5 may be fitted with various instruments and devices 21 for monitoring and controlling the device while in operation, and/or for sampling water for other testing and analyses. Other components not shown but which may be provided, include magnets, or screening baskets, and retaining or extraction devices.

Figure 3B:
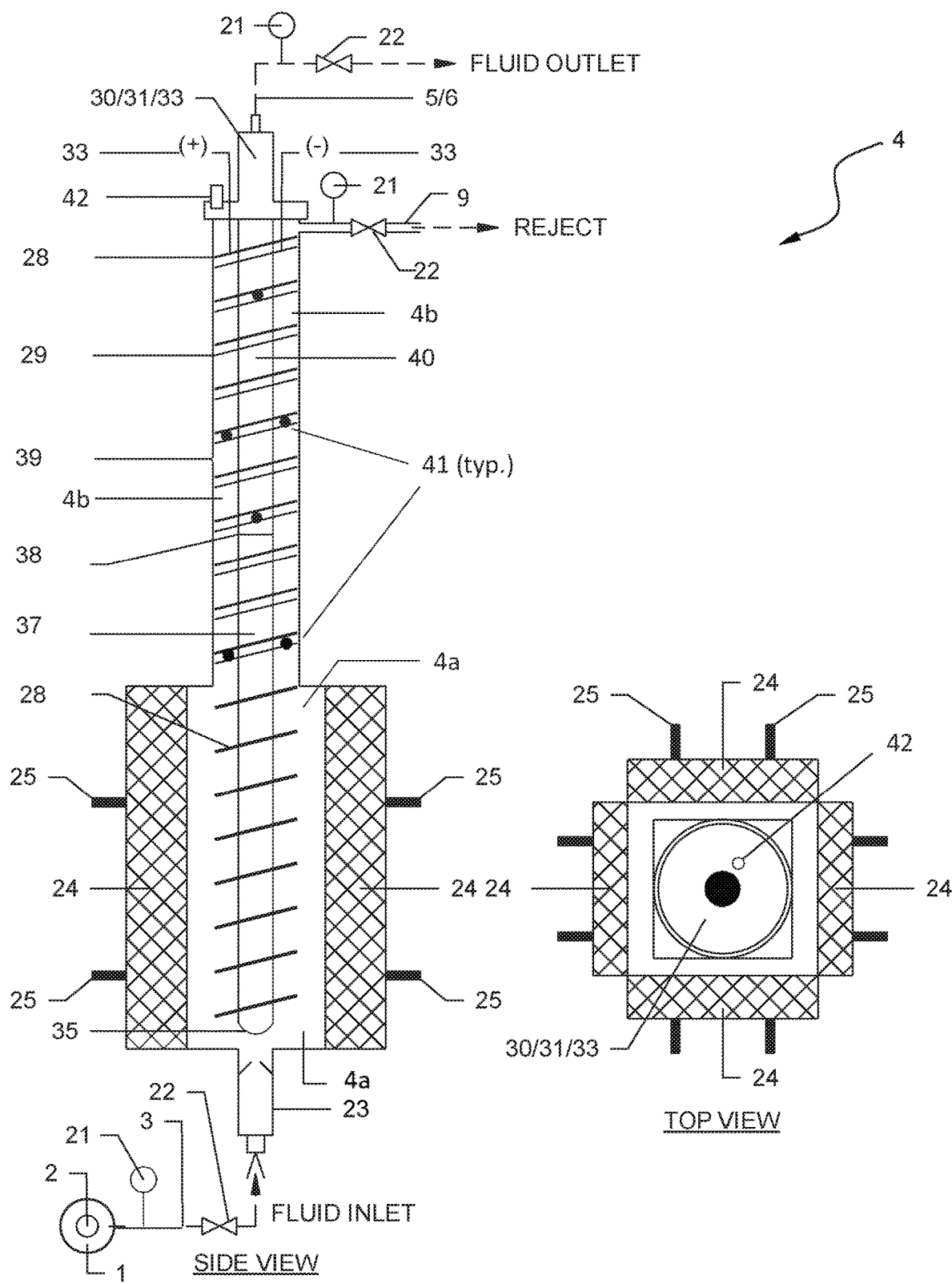

FIG. 3B presents a modified version of the reactor 4 shown in FIG. 3A where the cavitation chamber 4a is separated from the EC chamber 4b and into which one single electrode 28 of a helical electrode pair 28/29 extends to provide a target for inertial cavitation of the cavitation nozzle jet 23. The helical anode 28 and helical cathode 29 form an electrode pair 28/29. In another embodiment (not shown), the full helical electrode pair 28/29 extends into chamber 4a. With the cavitation jet 23 directed upward into the cavitation chamber 4a and acoustic field imparted by the transducers 24, the combined cavitation bubbles and bubble swarm propagate up into the EC chamber 4b mounted above the cavitation chamber 4a. The chamber housing 39 of the EC chamber 4b includes the EC component where both electrodes 28 and 29 are helically entwined, and where a central core in-line tube filter 40 serves to separate solids from fluid.

With one helical electrode 28 optionally present within the cavitation chamber 4a, and/or the extended central core helical electrode support rod 37, material of either the rod, the electrode, or both, are suitable for targeted cavitation erosion. The end of the rod 37 opposite from its cavitation target 35 is connected with an internal pipe-threaded fitting 38 to the filter 40. The helical electrode pair 28/29 shown are in the form of spiral screw open core augers that are offset vertically and rotationally to create a desired electrode gap secured with insulated spacers 41 to allow helical mating without contact between each other. The electrodes 28/29 shown are of different lengths, but flight patterns and dimensions are equivalent as shown. In other embodiments, electrode dimensions may differ provided they still fit in the housing 39, and one electrode can be optionally extended into the bottom chamber 4a. Each electrode 28/29 is typically composed of the same material along its entire length, although electrodes of different materials may be connected into a single electrode to accommodate the electrochemical need of the electrocoagulation process. For example, one electrode may be iron, and the other aluminum, or both either iron or aluminum, or one entirely iron, and half of the other is part iron and part aluminum. These metals or others suitable for use, and their surface area ratios to each other, including dimensionally stable materials such as stainless steel or graphite, may be provided. Various combinations and ratios of materials, spiral geometry, and metal sequencing all fall within the scope of the present disclosure, provided an electrode pair is provided and it operates in part or completely within effects of the cavitation field. In another embodiment of the technology not shown, an ultrasonic transducer rod may replace the solid rod 37 depicted, the in-line filter 40, or both.

Figure 3C:
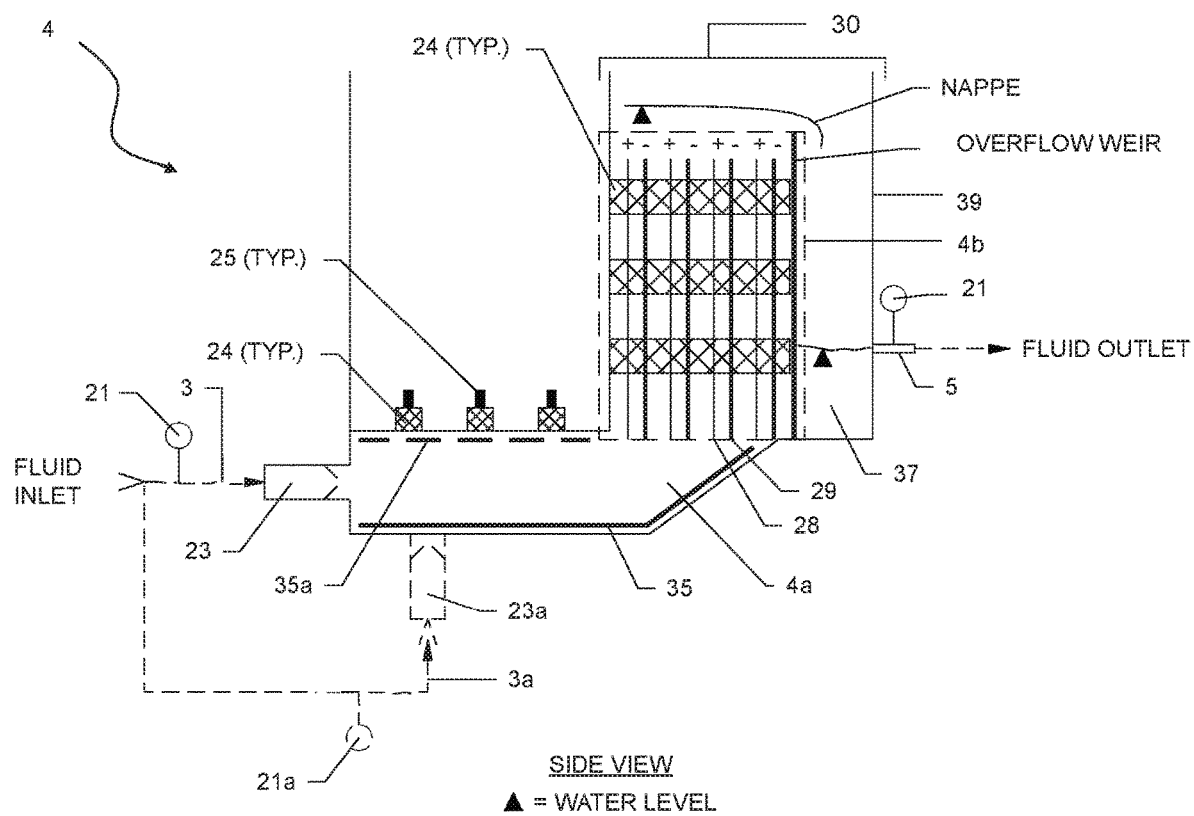
Figure 3D:
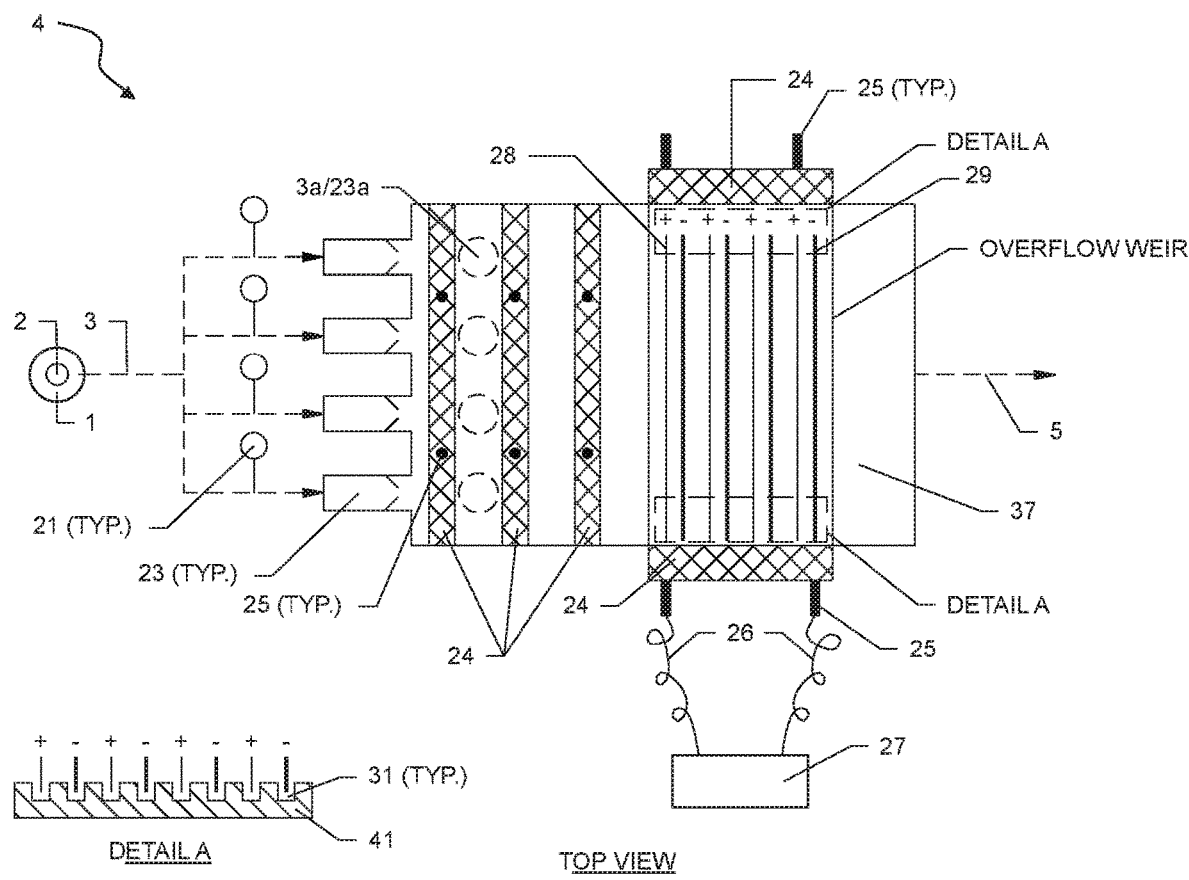
Figure 3E:
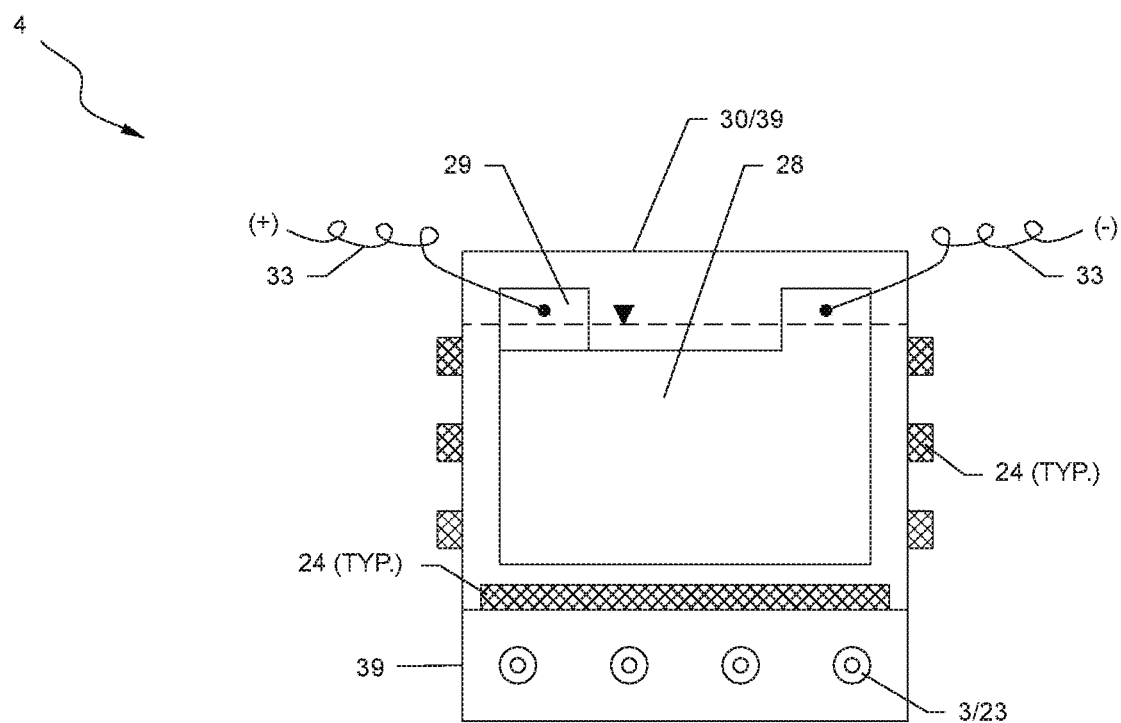

FIGS. 3C, 3D, and 3E depict multiple views of a flow-through multi-chamber tank-like containment where both a Cav reaction chamber and a Cav/EC chamber are provided in a single component to increase treatment flow capacity of the system described herein, while also being able to process more complex aqueous fluids characterized by more constituents and/or of higher concentration. As shown in these Figures, the difference in configurations pertains to the direction at which fluid is delivered. Other differences and variations are also possible and embodied within the Cav/EC reactor described herein. While the units illustrated are singular, they may be provided as a plurality in parallel or serial to each other.

With respect to FIGS. 3C, 3D, and 3E, aqueous fluid to be processed is delivered from the source 1 by a pump 2 or another system component via inlet piping 3 through one or more of CavNoz 23 into the cavitation chamber 4a. Depending upon CavNoz 23 orientation, cavitation target plates 35/35a may be appropriately mounted in the chamber 4a. For an end-mounted horizontal CavNoz 23, target plates 35 may be desired, and for the vertical upward CavNoz 23a positioning, target plates 35a can be used. Ultrasonic transducer arrays 24 with power terminals 25 mounted are provided above the chamber 4a to irradiate water within. An added benefit of the target plate 35 positioning is allowing for targeting of both cavitation sources. Target plate 35 is mounted on the flat and sloped floor section of the unit housing 39 that inclines to the combined Cav/EC chamber 4. In this arrangement, target plate 35 is impacted by nozzle 23, but also serves to deflect cavitation up to the Cav/EC chamber 4.

The geometry of the unit shown in FIGS. 3C, 3D, and 3E is intended to allow for the processing of increased water flow, increased retention time, and/or impart expanded influences of cavitation and/or electrocoagulation. The anode 28 and cathode 29 electrode pairs in the illustrated examples are plates that can be stacked in bundles where opposing sides of an adjacent specific electrode pair create another functional electrode gap for process reactions. FIG. 3E provides an end view of the Cav/EC reactor 4 in which a plurality of Caz/Noz jets 23 are aligned horizontally, although other alignment patterns may be provided to expand the resultant cavitation field dimensions within the chamber 4a. Water levels are also shown above which electrodes 28 and 29 are connected to wiring 33 of the power supply (not shown) to alternating tabs of each respective electrode 28 and 29 plate in a pair or bundle. Detail A of FIG. 3D shows a non-conductive spacer bracket 41 with appropriate insulated channels 31 to secure each electrode and to minimize movement and prevent direct contact with other electrodes. Channel brackets 41 are fixed to the vertical side wall of the housing 39 in alignment such that individual electrode plates may be slid down each of their respective channels so singular electrodes may be readily serviced. As part of the overall housing 39, a locking protective safety cover 30 is provided.

Water flows upward around individual electrodes through electrode pair surfaces. As water is subjected to the effects and impact of electrocoagulation electrodes, the water, its constituents, and electrodes are irradiated with acoustic sonication energy provided by additional transducers 24 mounted to the housing 39 of chamber 4. In reaction chamber 4 that receives cavitated fluid from the lower reaction chamber 4a, water is subjected to both cavitation and electrocoagulation. While these Figures depict two chambers 4 and 4a, use of only chamber 4a without cavitation from the nozzles 23 and/or associated transducers 24 mounted to the housing 39 of chamber 4a is also possible.

At the top of the electrodes, water flows across the overflow weir as shown in FIGS. 3C and 3D and creates a nappe as it falls into the maturation/overflow chamber 37. Water from this compartment 37 departs the unit through the outlet 5 and appropriate control and monitoring 21 for the process.

Figure 4:
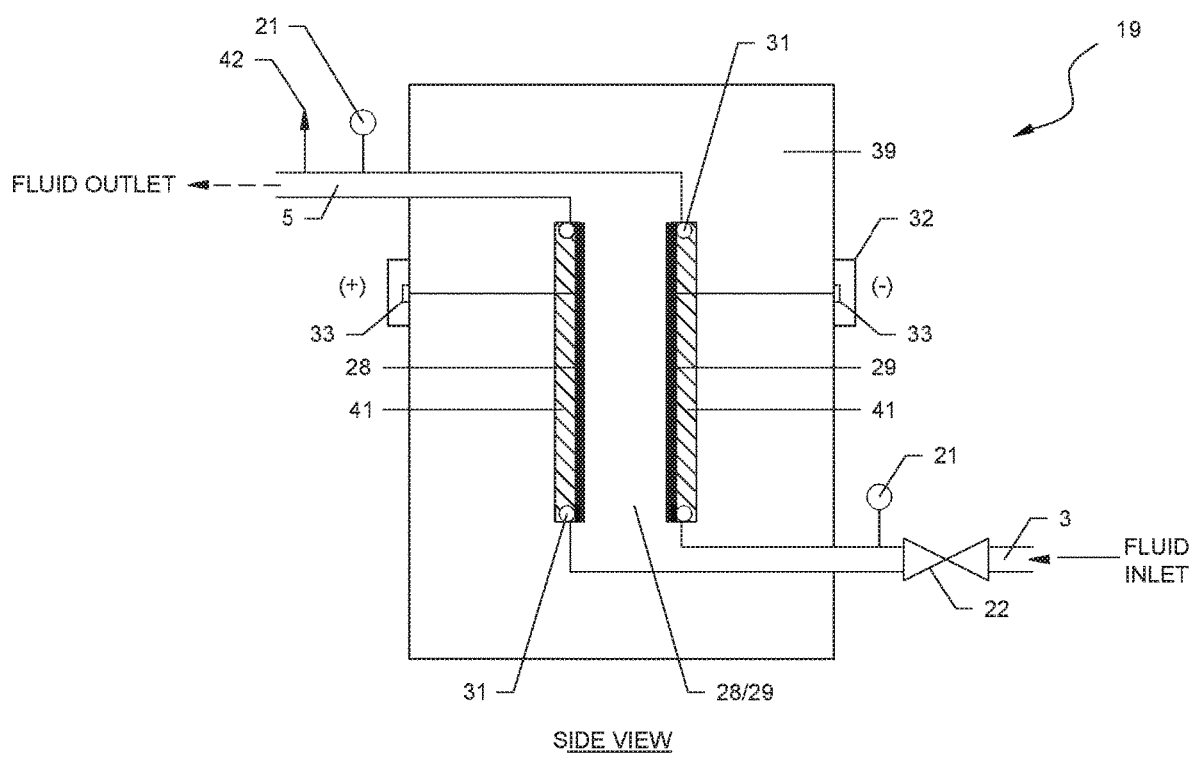
FIG. 4 is a schematic illustration depicting an embodiment of an electrolytic oxidation/reduction cell component suitable for use in the water treatment system described herein.

FIG. 4 shows an oxidation/reduction electrolytic cell 19 that induces oxidation or reduction reactions, and which may be used in the water treatment system described herein as may be required to treat constituents in aqueous fluid. Depending on the characteristics of the aqueous fluid being treated and the desired outcomes, the oxidation/reduction electrolytic cell 19 may be installed within the water treatment system prior to, between, or after other components of the disclosed system, with examples 19a, 19b, and 19c shown in FIG. 1D. The cell 19 preferably includes dimensionally stable electrodes 28 and 29 connected to a DC power 33 source that controls current voltage and amperage to deliver the desired current density for the electrode surface area of the provided device. A single cell 19 or a plurality cells in parallel or serial configuration can be provided in the water treatment system described herein to process flow rates and/or aqueous fluid constituents of any given application.

The cell 19 is electrolytic with the anode 28 and cathode 29 requiring terminal box 32 connections 33 to a DC power supply (not shown). Preferably, the electrode materials are not sacrificial and are made from stainless steel, graphite, graphene, tungsten, boron-doped diamond, or other suitable conductive material that will cause the necessary electrochemical reactions with the water and its constituents being treated at appropriate current densities and power wattage. In a preferred embodiment, the cathode electrode is boron-doped diamond on a niobium substrate, and the anode electrode is tungsten.

Fluid inlet 3 to the cell 19 may be controlled by a manual or automated valve 22 and may be adjusted based on data derived or otherwise obtained from monitoring and control sensors/instruments/sample tap components 21 installed at the fluid inlet 3 and/or the fluid outlet 5. Fluid outflow 5 may also be controlled by a manual or automated valve 22 with flow by-passes provided in the piping of the cell 19 within the overall schematic of the system described herein.

The electrodes 28 and 29 are sandwiched or secured within a tight, close tolerance housing 39 and are seated with an appropriate leak preventing gasket/seal 31 and structurally backed against a supportive, non-conductive insulating barrier 41 for single sided BDD. Together, electrodes form a pair and create an electrode gap 28/29 ranging 3-10 mm, depending upon characteristics of the fluid being treated, and performance response to reactions facilitated by the cell 19. Housing 39 may be modified to more closely resemble those in FIGS. 3A-E when using double sided electrodes, and a stack, or bundle of electrodes, or a plurality of electrodes are desired with dual-sided reactive surfaces. It is noted that cavitation may be deleterious to materials intended to have long-lives and are dimensionally stable.

By supplying power with polarity reversal and at appropriate current densities for the application and the selection of proper electrode materials, oxidizing or reducing conditions may be created within the cell 19 to affect treatment of various parameters needed to effectively treat water constituents. In an oxidizing operational mode, iron, manganese and arsenic, for example, can be converted to more reactive ionic states that are conducive to removal by adsorption, coagulation, subsequent floc maturation, and removal by solid separation devices of the water treatment system portion of the system described herein. The oxidation operational mode will also destroy various organic compounds, cyanide, and sulfide, as well as provide disinfecting conditions for bacteria. In a reducing operational mode, constituents such as hexavalent chromium, and selenium may be converted to more reactive states for their subsequent treatment by adsorption, coagulation, subsequent floc maturation, and removal by solids separation.

A gas collection and separation portal 42 is provided when removal from the fluid stream treated by the device is desired.

Figure 5:
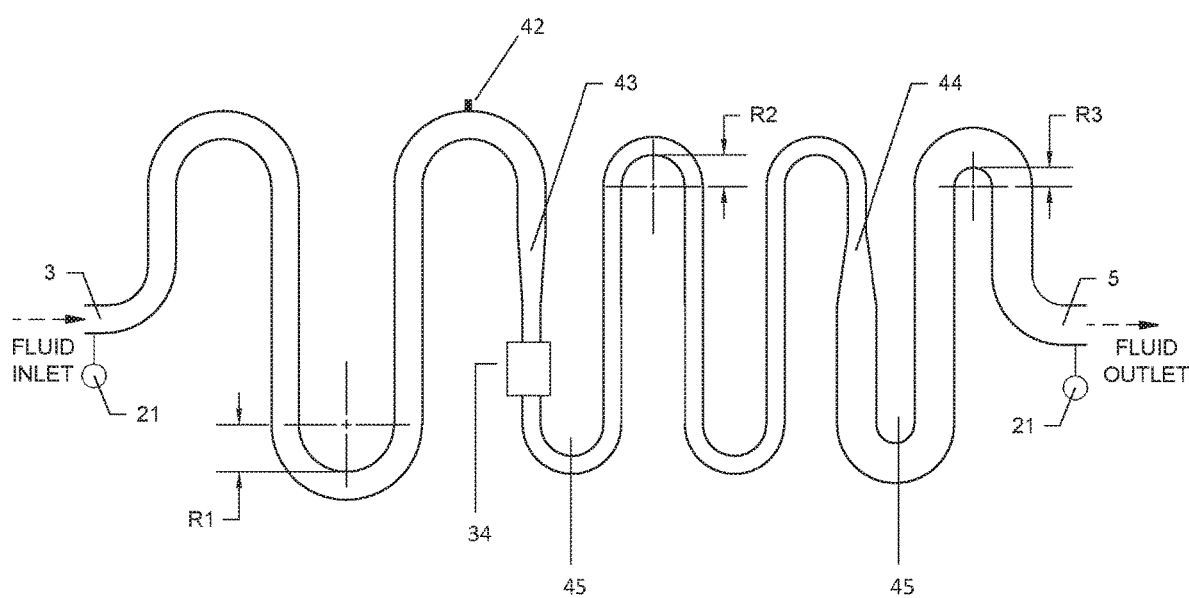
FIG. 5 is a schematic illustration depicting an embodiment of an in-line sinusoidal mixing reactor suitable for use in the water treatment system described herein.

FIG. 5 depicts an embodiment of an in-line flow-through sinusoidal serpentine pipe/tube mixing reactor suitable for use in the system described herein. The mixing reactor as depicted shows various feature examples that can be incorporated optionally singularly or in plurality into its design for functional mixing of aqueous fluid or water with reactants created by or delivered to the system described herein. The mixing reactor causes limited backpressure and hydraulic head loss while also serving as a flow-through reaction device for reactants in the fluid. An in-line component as that depicted, or one that provides the same functionality, may be inserted at any location between or after various process components of the water treatment system to maximize desired mixing and process reaction performance outcomes.

When installed within the water treatment system described herein, the sinusoidal serpentine mixing reactor shown in FIG. 5 provides for in-line mixing and/or reactions of a flowing fluid with and between its carried constituents, including those that may have been generated in a process system component upstream of the fluid inlet 3, and/or when supplied to the fluid in or prior to entering the mixing reactor. It is well reported and known that in-line mixing is accomplished by means of increasing contact areas of striated flow caused by differential velocity between layers of flow within the fully flooded pipe or tube. Unlike other mixing reactor devices, the mixing reactor described herein includes: decreasing and increasing pipe/tube alignment curvature radii 45; constriction 43 and expansion 44 of pipe/tube cross-sectional area; gas outlet(s) 42, a lack of flow obstacles such as pipe/tube joints or fittings, paddles, blades or other abrupt flow impactors; optional in-line screen, catalyst retaining/granular solid extraction/reaction enhancing devices 34, and no motorized or energy consuming mechanical devices so that fluid leaving the unit at the fluid outlet 5 is mixed adequately for subsequent treatment, processing or discharge with limited pressure drop.

As shown on FIG. 5, the tube includes curvilinear radii changes 45 spaced along the overall plane of the unit within the pipe/tube run length of the mixer. The unit may be constructed from a variety of material choices such as stainless steel, HDPE, PVC, etc., however, its longevity and resistance to degradation from the chemistry and other characteristics of the fluid being treated is are necessary design criteria.

In-line mixing performance is based upon flow velocity differentials of fluid flowing within a flooded pipe or tube and the low viscosity and low Reynolds number of aqueous fluids. The velocity of a flowing fluid in a closed channel or pipe is greatest within the core of the fluid's flow due to the lack of a friction surface created by the pipe/tube wall. However, in a radius of smooth-bent pipe/tubing 45, the water flow within the pipe/tube travels longer distances on the outside of the radius, and slower on the inside of the radius. This imparts differential velocity layers within the water volume present within the length of the tube bend(s). As flow approaches a pipe alignment curvature 45 it moves towards the outer pipe/tube wall due to centrifugal force, thus creating velocity and micro pressure gradients yielding vortical flows, and thus mixing. Secondary flow growth due to a change in curvature (R-1, R-2, R-3) from a straight alignment to bent, back to straight, and then bent back in the other direction (sine wave pattern) causes transverse directional fluid flow that shifts flow vortices as flow encounters the curvatures 45 between the pipe sidewalls and the central core where less friction exists to slow velocity.

Further mixing will result from differential flow velocity within a pipe run bend by providing several varied changes in bend radius (R-1, R-2, and/or R-3) turn sharpness. As the curvature radius is reduced and the bend sharpens, fluid velocity differential increases within the pipe through the radius curvature run. As the curvature radius increases, velocity differentials decrease causing more changes in flow patterns, thus enhancing mixing.

Another blending feature of the disclosed mixing reactor is provided by constriction 43 and enlargement 44 of the pipe/tubing diameter using welded bell or such taper/flare fittings without inclusion of turbulence causing obstacles such as paddles, blades, or deflectors that create local strain to passing fluids and carried solids. By changing the pipe cross-sectional geometry of the pipe, fluid velocity also differentiates as fluid passes through the pipe diameter geometry transition. Under constant pressure and flow, velocity will increase as the diameter decreases, and will decrease as the diameter decreases. As with alignment curvature, cross-sectional area changes disrupt flow layers and cause transverse velocity patterns that increase the interaction and contact of water with and between its carried constituents.

Process control sensors and monitors 21 should be installed prior to and/or after serpentine pipe/tube bends to evaluate mixer performance, reaction status, and/or operating conditions at locations where such monitoring is desired. An adequate distance between the monitoring location and the nearest tube/pipe geometry change will likely be required based upon monitoring/sensor manufacturer recommendations. Typically, a distance of ten (10) times the radius is adequate.

An in-line magnet/screen, catalyst retaining/granular solid extraction/reaction enhancing capture/containment device 34 is intended to show the inclusion of a device or devices that can be located at any number of locations within this unit, or other components of the water treatment system. The devices of this unit 34 may include material screens to remove debris and large particles such as small media fines, to retain and position granular catalyst in-line with fluid flow to facilitate reactions, and/or include external magnets that help excite constituents, or align those that are polar charged constituents within the fluids to facilitate reaction, or to remove particles and fines that respond to magnetic fields (such as ZVI) that carries downstream from the media reactor chamber. For ZVI, particle fines will be magnetically held against the inner wall of the mixing reactor. The installation for this functional unit may be at the bottom of a curvature and include a cleanout portal for maintenance servicing, however ZVI particles, such retained, may provide further benefit to process reaction with their presence. The locations of the capture/containment device 34 and other features herein described are depicted in this Figure are only intended to show that the functions such an installation provides is or are part of the described embodiments, and do not specify an exact location within this device, or to differentiate between the functions of the device 34 or others herein disclosed.

Yet another benefit of the mixing reactor embodiment is to allow reactants, either added to the fluid or created by the treatment components of the disclosed system, and their reactions to proceed due to mixing and reactant contact within the sinusoidal unit. Mixing will be more laminar than that of other turbulent static/mechanical mixers and allow for flocculated solids to mature in density and mass without localized strain from flow obstacles that place shear stresses on solids causing their disruption and degradation.

Another embodiment of the mixing reactor not shown in FIG. 5 is a change in length of pipe/tube runs (legs) between curvatures. Leg lengths can be all the same dimension, or leg length may be varied throughout the device to further facilitate mixing and reactions. Also not depicted in FIG. 5 is the positioning of the mixing reactor. It may be placed so that serpentine pipe plane is flat and parallel to the ground, or the plane rotated with the inlet 3 at the bottom and the outlet 5 at the top. These orientations may either facilitate performance and/or accommodate the space available for its location within a system at the site of the system's application.

The mixing reactor described herein provides a high mixing index, increases residence mixing/contact/reaction time with an increase in overall length and the quantity and frequency of features herein described, and provides low resistance to flow thus reduced head loss with lower pump energy demand without need of a motor driven or passive flow blocking obstacles such as ribbons, spindles, paddle or flow diversion arrays.

A plurality of mixing reactors can be arranged in parallel with individual units connected to a flow splitting control manifold positioned prior to the inlet 3 and after the outlet 5 of each unit, or in subsequent serial configuration. These configuration arrangements can accommodate situations where flow rate from the water source fluctuates or is intermittent, or if more or less mixing and retention time is needed to facilitate desired results.

Figure 6:
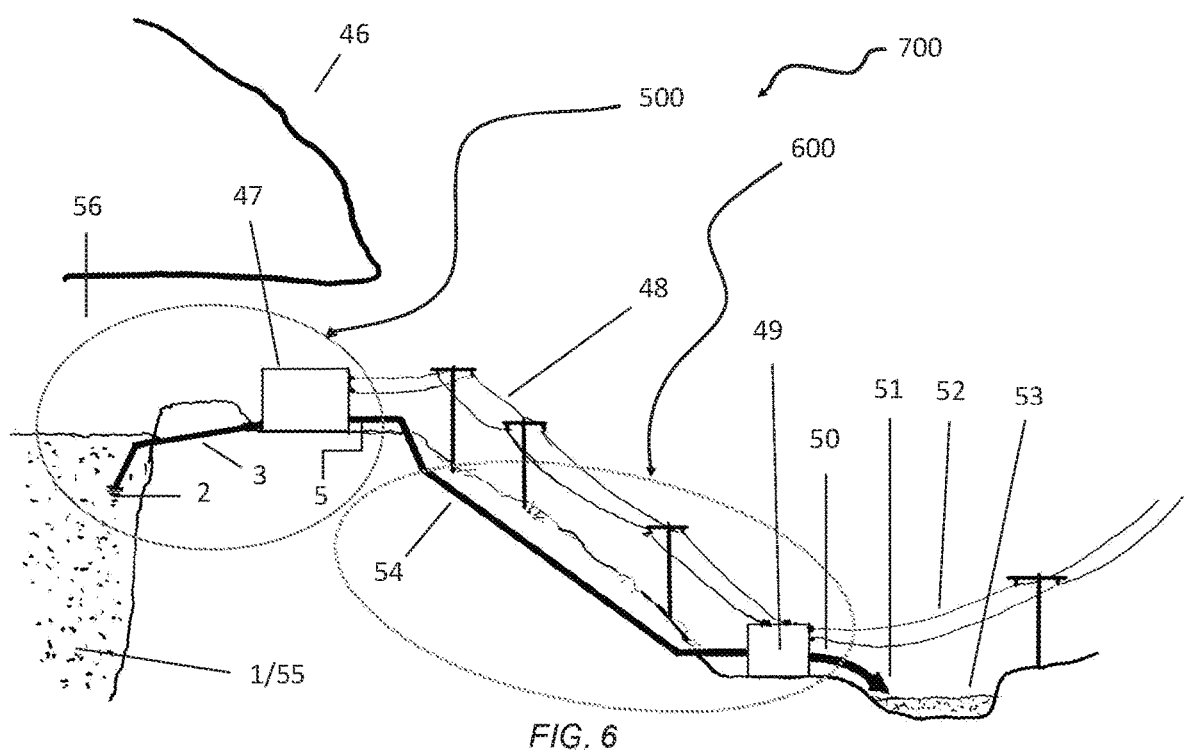
FIG. 6 is a schematic illustration of a combined water treatment and hydro-power system according to various embodiments described herein.

FIG. 6 illustrates a configuration 700 that includes both the water treatment system 500 and a hydro-electric power system 600. The treatment system 500 includes a water source 1; intake pump 2 (if needed); feed piping 3; housing 47 for water processing components as shown located within the mine tunnel or adit 56, and the treatment system outlet 5. In this embodiment, the application site is where acid mine drainage (AMD) 55 produced by the mine 46 is removed via piping 2 from a mine pool 1, processed by the components within housing 47 for acidity and heavy metals, and flows by gravity down-gradient through a penstock 54 to a power generation system 49. Electricity is conveyed via, e.g., power lines 48 to power the water treatment system 500 located within the mine tunnel/adit 56. Excess power is sent to the grid 52, and where power generation is not fully adequate for water treatment, power from the grid is supplied via grid 52/power generation system 49/power lines 48 back to the treatment system 500 housed within housing 47. As shown, both water treatment system 500 and power-generation system 600 make up the configuration 700 to provide economic benefit in addition to that of water quality. This is of interest not only at active mine sites, but also those that mines that are inactive and/or abandoned from legacy operations The water treatment system 500 described herein is designed to accommodate source water ranges of flow, contaminant parameters, their concentrations in untreated water, and their removal/treatment to meet desired limitations, typically established by jurisdictional governmental agency regulatory discharge permits or allowances.

At many mine sites, a mine pool 55 may not be present, and at such sites, a berm or retention feature may be required to allow flowing water drainage to build up in depth. While FIG. 6 shows a pump removing water from the mine and transferring it to a feed line to the treatment system, gravity may also be used to drain water without a pump through a feed pipe intake when adequate hydraulic head exists to allow for controllable water flow to the treatment system from the water source.

As depicted, the pumping rate will depend upon overall drainage conditions specific to the site and as designed into the integrated configuration 700 including water treatment system 500 and hydropower system 600 and controlled as part of the water treatment system operation.

Treated water departing from the outlet 5 of the system 500 flows into the penstock 54 of the hydro-electric system 600. The penstock 54 conveys treated water down gradient to a power generation system 49 (e.g., turbine/powerhouse). With adequate head, flow, and pressure, electric power may be generated for use by the water treatment system 500 or delivered to the local power grid 52. Power transmission lines 48 to the treatment system 500 housed within housing 47 and to the grid 52 is controlled and converted in the water treatment system 50 and/or power generation system 49 to appropriate form for use. Water passing through the turbine within the power generation system 49 will depart via the tail race 50 to the discharge outfall 51 to the receiving water 53 or basin.

The housing 47 may be a shipping container or other similar protective containment that fits dimensionally within the tunnel or adit 56 and is installed on a leveled pad. Larger structures may also be used based on space available or water treatment system size requirements. All housing structures will require design to accommodate conditions related to weather and/or ambient working environments that will be encountered over the duration of the system's use for any given application.

When source drainage 55 from the mine tunnel/ad it 56 or other water source does not have adequate flow to generate adequate or sufficient power to properly treat water, power from the grid may be supplied, and/or via a generator (not-shown) and/or other power supplying sources (wind, solar, etc.) that may be also be provided (not shown). Ideally, and certainly dependent on the hydrology, geography, and topography of any site, the hydro-electric system 600 may generate power in excess of power demand from the water treatment system 500. In such operating sites or conditions, excess power may supply another need or demand, or be sold to the grid (if available) as a cost-benefit. If the site is not conducive or practical for hydropower generation, the hydro-electric system 600 may be eliminated, and water from the outlet 5 of the treatment system 500 may be conveyed by pipe 54 or channel (not shown) directly to the outfall 51 and receiving water or basin 53.

While depicted in this embodiment showing the treatment system 500 positioned in the mine, the system may be alternatively housed outside of the mine. In still another embodiment, the treatment system 500 may be positioned between the power generation system 49 and the discharge outfall 51 that discharges into receiving water or basin for capture and re-use/recycling. In such an embodiment, hydropower generating power components would need to be made with materials resistant to degradation by constituents of the untreated water, such as acidity, suspended solids, etc. In the presented embodiment of FIG. 6, however, added benefits of system security, constant ambient operating temperatures, and protection from adverse weather, is provided by the mine tunnel itself when a locking gate is installed at the tunnel entrance.

In another embodiment the treatment system 500 may be installed anywhere source water requires pre-treatment for subsequent treatment, or treatment for discharge, reuse, or recycling where components of the disclosed system adequately address constituent parameters to meet required or otherwise prescribed permit limits without the hydroelectric system 600. Such installations may be at manufacturing facilities, groundwater or other remediation sites, existing wastewater treatment facilities, or other locations where water requires treatment that may be effectively provided by the disclosed system. A hydro-electric system (600) is not required.

Media: Zero-Valent Iron/Alumina, etc. and Stationary vs. Actively Moving Media

Reactive media disclosed herein preferably is zero-valent iron (ZVI) that is high purity metallic iron ($Fe^0$) that can be provided as granules or flake of various gradations and nominal diameters. Other forms of media can be alumina, ceramic, anthracite, catalyst such as platinum pellets or other materials that can favorably benefit treatment objectives with their presence and contributions to process chemistry. For use in the media mixing chambers, the media should be able withstand the conditions to which they will be exposed to the degree appropriate without compromising treatment objectives. Media can be supplied in the media contact reaction chambers, but also capture/extraction devices also disclosed within the present technology. Another purpose of the media as discussed in other portions of this disclosure is to provide ample of reaction sites for the processes to affect desired treatment. These reaction sites can be made available in the from the media is provided, but also as a result of their processing within system components, for example, by cavitation erosion if so desired.

Water Contaminants as Useful Reactants

As discussed herein, the technology facilitates chemical reactions and physical interactions that cause treatment of contaminants hosted in source water and where some contaminants in host water may be altered by the technology described herein to become reactants that provide added benefits for the overall effective water treatment. In some embodiments, sulfate contained in untreated AMD can be converted by the technology to sulfide that will then react with metals contained in the AMD to form metal-sulfide mineral species of low solubility that may then be coagulated to larger diameter particles to enhance their settleability and separation from the water. Sulfates may also be converted to persulfates that are powerful oxidants that can affect the ionic states of soluble iron and manganese, where their oxidation yields less soluble species. Another example would apply to bicarbonates derived from the acid degradation of carbonate minerals that can be converted to carbonates, that like sulfide, form highly insoluble mineral species with various heavy metals. Iron is typically present in AMD in its Iron (II) dissolved state. While Iron (II) is importantly reactive in the oxidation/reduction chemistry of iron in general and this technology, but unless reacted, it remains problematic if not removed. Iron in its $Fe^{+2}$ ionic state will lose an electron to form $Fe^{+3}$ that will react and otherwise adsorb other constituents and facilitate overall precipitation, including aluminum provided in AMD water, electrocoagulation electrode contributions, or reactive media. This electron loss is important to the reaction of the technology as previously discussed, and thus the technology's ability to manipulate iron in all of its primary states is important, including ZVI. Use of iron already within AMD to be treated makes iron already in water an important constituent to be converted into a contributing part of the process. For example, sulfate within AMD can be converted to sulfide or persulfate, bicarbonate to carbonate, and Iron (II) to Fe (III) where these created beneficial reactants enhance overall technology reactions. Expanding on the sulfate example that is contained in untreated AMD, the technology described herein can create sulfides that will react with metals in AMD to form highly insoluble metal-sulfides, and in another mode, create persulfate that can convert highly soluble Iron (II) in AMD to less soluble more reactive Iron (III).

Cavitation

To better describe the importance of cavitation to the present technology, a brief discussion of the phenomenon is merited. In general, cavitation is the result of alternating high and low pressures induced to a fluid in rapid sequence that propagate compression waves within and through a fluid. More specifically, cavitation can be classified as either inertial or non-inertial where the inertial type is simply caused when a void or bubble collapses violently and quickly in a liquid, and non-inertial cavitation occurs when a cavitation bubble changes in size or shape due to influences in the fluid such as an acoustic energy field.

Inertial cavitation pressure changes cause expansion and contraction of water or the fluid resulting in voids or cavities (or bubbles) filled with vapor derived from the fluid itself. Violent inertial cavitation bubble collapse creates bubble content temperatures that can surpass 4500° C. with pressures of roughly 1000 atm thus imparting extreme physical and chemical conditions to liquids with physical factors causing erosion, and chemical factors causing corrosion. Hydroxyl and then peroxide radicals are formed as a result of the high temperature thermal disassociation of water.

Non-inertial cavitation does not necessarily cause explosive bubble collapse and thus limits cavitation damage. For example, high frequency wavelength ultrasound is used for medical diagnoses of the human condition without imparting such destruction to irradiated tissues and cells. In another example, ultrasound is used to clean parts of accumulated scale, oxidized foulants, and the like under controlled conditions and energy application without damaging these parts. But when energy is overapplied in sonication cleaning systems, parts can be destructively damaged as evidenced by pitting in surfaces directly exposed to the item indicating that ultrasonic acoustic cavitation can provide both types of cavitation. Displacement caused by non-inertial cavitation bubble oscillation of shape and size does enhance mixing and cleaning but can also cause corrosion and erosion.

Cavitation types collectively causes the formation, growth, oscillation, and/or implosion collapse of a bubble that converts kinetic energy from liquid motion to heat within the contents of the bubble. In an active cavitation field, countless formations, growths, oscillations, and collapses of individual bubbles create a propagating bubble swarm.

The deleterious effects of cavitation caused erosion and corrosion on metals and other materials is also well documented as are methods to avoid such degradation. Erosion is a physical form of degradation where small particles (e.g., as small as "nano" dimensions) of the material are released. When a bubble or a bubble swarm reach, form, grow, and collapse near a surface, the energy can erode or pit that material. The pitting can accelerate due to the creation of increased surface area from both the disrupted surface and the eroded particle near the surface where bubbles can nucleate and further cause small material particles to be released. Corrosion, however, is a chemical degradation process where impacted material dissolves or is altered to a new form as a result of oxidation resultant from the presence of water and formation of localized oxidants and mixed oxidants such as: oxygen from ambient source conditions, hydrogen peroxide, ozone, and hydroxyl radicals when water that is broken apart within cavitation bubbles, and the impacted material such as iron, aluminum, or other oxidizable material.

Cavitation erosion provides benefits used by the present technology. In one embodiment, cavitation erosion and corrosion clean and removes scale, deposits, and other surficial materials on electrodes that reduce their performance electrodes due to passivation or by reducing the conductivity and reactive surface within an electrolytic cell and its electrode pair or pairs positioned within the cavitation reactor or field. As part of the cleaning benefit, surfaces are exposed through pitting and fragmented release from materials immediately adjacent to the erosion site where impact solids are freed by cavitation collapse. The solid fragments create a larger reactant surface area relative to other active surfaces of media or electrodes, thus contributing to increased overall rate of reactions provided by the technology described herein.

Cavitation erosion causes the release of highly reactive small particles of media (such as metallic iron, also called Zero Valent Iron—"ZVI") into the fluid being processed. ZVI, and other materials, such as metallic aluminum, are reactive to constituents of impacted water, and in particular, acidity, as discussed elsewhere in this disclosure. The small micro- and even nano-sized particles that erode from a large surfaced area such as an electrode or a target material result in substantial increases in reactive surface area on a mass of metal to volume of metal basis and directly increase reaction rates of the described system relative to when particles have not been heavily eroded and mixed into the cavitated water and reactions are limited primarily to just the surface of an electrode.

The sonication can facilitate oxidation of iron complexes by created hydroxyl radicals and mixed oxidants formed and oxygen already present in water. Cavitation corrosion chemical reactions initiated by formation of oxidizing substances cause the release of metal ions that are in condition to interact with other reactants of the disclosed system and those such as acidity contained by the untreated and partially treated water. In the present system, cavitation corrosion is incorporated to beneficially enhance important reactions related to acidity, heavy metals, reaction site location surface area, precipitation seeding, adsorption, and other chemical processes.

Where reactive surfaces are exposed and cleaned by erosion, these reactive surface areas, including the disrupted sites where cavitation erosion occur all allow for enhanced water dissociation to hydrogen and oxygen, and metal-acid reactions driven by hydrogen/hydroxyl radical interaction with acid-causing hydronium ions to drive desired pH changes in acidic fluids. Cavitation excites materials contained within the fluid, and with changes in pressure, temperature, oxidants, particle surface area and increased reactant contact interactions, cavitation activity increases chemical activity of reactions in solutions that facilitate increased progression to desired reaction equilibrium.

Cavitation can minimize the diffusion of hydrogen ($H^{3O}$) ions into the water and enhance formation of hydrogen ($H_2$) gas bubbles on particles that are corroding, but also on electrode surfaces that also form hydrogen as a result of the electrolysis of water and oxidation of a metal. As hydrogen bubbles leave the water or are no longer readily reactive due to large bubble: water surface areas, process reactions will continue to move towards equilibrium balance previously limited by hydrogen when present, thus increasing the concentration of hydroxides ions relative to hydrogen ions (acidity is lowered as measured by pH). With hydrogen ion diffused into water, reactions are hindered, and acidity remains or can been increased, i.e., pH is lowered from an increase in hydrogen ion concentration relative to available hydroxide ions.

With further respect to process chemistry, cavitation excites materials contained within the fluid, and with changes in pressure, temperature, oxidants, particle surface area and increased reactant contact interactions where cavitation activity increases, chemical activity reaction rates also accelerate. Desired reaction equilibrium is facilitated between hydrogen atoms as they are generated on both eroded particles and electrocoagulation electrode surfaces and electrons react with hydronium ions/acid salts that serve to minimize overpotential electrochemical imbalances at electrocoagulation electrode surfaces. With cavitation contribution to reactions of the disclosed system, demand for power to drive similar ions off electrocoagulation electrodes, such as precipitation causing iron and aluminum at known ratios, is minimized and electrode surface area can be optimized, thus also reducing sacrificial electrode reactor size for the EC component of the process.

Sonication minimizes electrode fouling and buildup of scale, including ferricrete, iron-hydroxide, and other precipitants, including metals that nucleate within the oxidized iron oxide and hydroxide products. When these precipitate in mixing water instead of on electrode surfaces, the solids are more easily carried away from electrode surfaces where their electrocoagulation-enhanced precipitation can proceed more efficiently. Metal-containing solid floc maturation and settling separation removal occurring outside of critical electrical pathways and surfaces where critical hydrogen gas is generated and remaining hydroxide ions will react with hydrogen ions that cause the acidity in acid mine drainage allows for increase treatment flow capacity using smaller equipment components.

Cavitation of fluids is well known to cause mixing resultant from bubble implosions and oscillating shape changes that in turn create displacement pressures that directly affect surrounding matter. When in cavitation fields, suspended solids are disrupted, and the flow patterns caused by the bubble swarm facilitates dispersion of the materials as well as other constituents throughout the fluid by displacement and diffusion. The formation, growth, and collapse of bubbles also create micro currents in the fluid that cause transverse flow patterns that increase fluid constituent contact.

Cavitation embodied in the present system integrates inertial cavitation from fluid-dynamic mechanics without electricity, and more limited inertial cavitation, but elevated levels non-inertial cavitation using ultrasonic acoustic generating methods to obtain the maximized benefits of both erosion and corrosion, but also surface cleaning, mixing, and oxidant formation in the presence of concomitant precipitation reactions enhanced by electrocoagulation for the treatment of acidity, heavy metals, and the oxidation of various constituents dissolved in or carried by water.

In a preferred embodiment, cavitation nozzles included in the feed piping to the electrode reactor chamber where cavitation bubbles intentionally impact target plates and electrodes to provide for release of plate matter in its zero-valent ionic state as result of cavitation erosion. When installed upstream and injecting into a media reaction tumbler, the cavitation bubble swarm will impact media that will cause the release of material particles as a result of cavitation erosion. A water jet cavitation nozzle (or nozzles) added to influent piping that feeds a chamber fully submerged reaction chamber will cause inertial cavitation controlled by the feed fluid pressure, flow rate, the nozzle orifice diameter, internal taper geometry of the overall design, and/or receiving volume, geometry, and pressure within the downstream piping or chamber.

Immediately after orifice egress, water enters an enlarged cross-sectional diameter where the fluid volume expands rapidly, and velocity is reduced causing an immediate drop in pressure from that of the feed water pressure. This pressure differential causes cavitation that propagates a bubble swarm into the receiving fully submerged chamber.

The cavitation water jet nozzle (CavNoz) or nozzles utilized in the examples disclosed herein, were machined from stainless steel for the housing material. The internal zirconium orifice tip secured in-place within the tapered housing by the water feed pressure could be exchanged to units with 2.5, 3, or 5 mm diameters, allowing for nominal flow rates of 1.3, 2, and 6 gallons per minute with a minimal pressure differential between feed inlet and outlet of 25-30 psi. In preferred embodiments these or other nozzles of different materials of construction, flow rates, orifice diameters and pressure ratings can be utilized to generate cavitation bubbles and/or bubble swarms within the receiving reactor. Nozzles can be utilized singularly or in a plurality to produce inertial cavitation using impacted source or other water from obtained from various locations derived from or imported to the water treatment system described herein.

The submerged reaction chamber that receives nozzle-cavitated fluid is also irradiated with ultrasonic energy (sonicated) at set wavelength frequencies with adjustable power modulation intensity to not only create non-inertial cavitation, but also inertial cavitation where bubbles and bubble swarms from the CavNoz are immediately affected by the ultrasonic energy field in the chamber.

Sonication can be performed using an individual piezoelectric transducer such as an ultrasound horn, cone, or rod, for example, or as in this system described herein where combined transducers are assembled in arrays of similar wavelengths. Piezoelectric transducers convert electric energy to mechanical vibrations with transducer outputs typically ranging from 20 to 200 kHz, such as 25 and 170 kHz in some transducer array combinations, and in some preferred embodiments, at 40 and 68 kHz. In a preferable application of power, power to each transducer or transducer array can be modulated slightly above or below its frequency rating (+/−1-3%) by the arrays' respective ultrasound power generators that also provide controllable wattage power within the limits of the selected generator and as determined by treatment.

For the examples presented herein, power generators were rated at 1000 W with up to 500 W of power available per each of two channels. While these units were limited in their maximum outputs, other commercially available power units with matched transducers are available to deliver multiple 1000's of watts of power. For large flow situations, or particularly complex or recalcitrant water, much higher power ratings with a larger range of frequency modulation may be required as an embodiment of the disclosed system where acoustic energy applied to water is in the range of 20-200 kHz, or even 300 kHz, depending on the characteristics and chemistry of the water being treated. For mine water examples contained herein, transducer frequencies of 40 and 68 kHz provided by separate transducer arrays with both used together and in conjunction with other embodiments produced acceptable results. The transducers were mounted on the outside of the sonication chamber in the examples, but transducers can be alternatively mounted on the external wall of the reactor, depending on depending on transducer and cavitation reactor design.

As with nozzle-induced inertial cavitation, sonication deagglomerates solids suspended in the fluid to create more surface area for reactants, such as hydrogen, heavy metal, and other ions and particles, to interface. Inertial cavitation also significantly increases reaction site surface area within the water as created and provided by the eroded particles derived from cavitation erosion of purposefully placed targets as well as electrode surfaces.

Unlike cavitation derived from the jet nozzle(s) where flow and feed pressures modified or adjusted during operation by fluid delivery pump adjustments, ultrasonic cavitation powered by power supply controllers that are distinct and separate from that provided by the cavitation causing jet nozzles. By adjusting the power applied to the piezoelectric arrays and its modulation, coupled with electrocoagulation adjustments for power per unit area of electrode surface and its polarity, and with consistent water flow and pressure feed into the reactor, additional control for cleaning, erosion, and corrosion is provided that would not otherwise be possible.

Unlike jet nozzle created cavitation, ultrasonic caused acoustic cavitation cannot easily impart high levels of cavitation causing erosion on materials in a tight focused area. Jet nozzles utilize a highly pressurized water stream from a pump or head pressure that causes damaging cavitation and enhanced oxidation reactions due to the collapse of bubbles. Bubble swarms focused on materials to facilitate erosion generate small particles that create new reaction sites without the electric power required by sonication and electrocoagulation components. Acoustic cavitation will also cause erosion and corrosion, but in a more limited and controlled manner such that electrodes are effectively cleaned, but not severely damaged or prematurely consumed, all while requiring electric power.

A proper balance between nozzle and sonication provides a cost-effective approach to the treatment of acidity by engaging the chemistry of hydrogen ions, metal, and hydroxyl radicals caused by cavitation, but also electrocoagulation within the same field present in reaction chamber. Acoustic cavitation, because of its non-inertial mixing at the molecular level, also facilitates the release of hydrogen ions and hydrogen gas into the passing fluid as it is generated on the surface of an electrocoagulation electrode, whereas the harsh effects of inertial cavitation on ZVI will accelerate release of hydrogen gas bubbles as hydrogen ions are reduced at the surface of EC electrodes.

Electrocoagulation

Electrocoagulation (EC) was identified as a technology to treat water back in the later 1800+s. Some of the first patents for electrocoagulation were issued in the early 1900's to treat ship bilge water and the wastewater using iron and aluminum sacrificial electrodes. Since that time, the use and development of electrocoagulation waned in favor of conventional water treatment chemicals such as alum, lime, sulfates of iron, and then polymers. Over the past decade, electrocoagulation research and commercial applications have increased as treatment chemical and resultant solid waste management costs have increased, and as technology has advanced to deliver and control power to the electrodes as has a better understanding of how the process works to remove contaminants from water. However, the concept of using electrodes to cause the destabilization, precipitation, and coagulation of contaminants has not changed.

EC imparts electrons to the water that change the charge of very small to large particles to encourage their attraction via coagulation-flocculation principles. EC also drives metal from the electrode surfaces as coagulation agent ions into the surrounding fluid. Other chemical reactions also take place at the electrode surface that include the hydrolysis of water, formation of oxidants, and the formation of various metallic (traditionally iron and aluminum) oxides and various hydroxides. In this manner, electrode materials used in EC are depleted by electrochemical corrosion caused by the process.

While coagulation-flocculation provided by EC is predominant, EC is also well known to cause pH of treated water to shift to neutral from acidic and alkaline pH. These pH adjustments are a result of hydrogen and hydroxide reactions that take place at the electrodes as metal (iron) is oxidized, and electrons are made available. Unfortunately, these reactions require significant levels of electric power to drive essential iron ions from the electrode, and the surface area of the electrodes provides only limited reaction sites where acidity can directly cause metallic iron corrosion.

An important component of EC is that when iron is used as an electrode, the material is actually steel. Steel is an alloy that does contain iron, but also carbon and other metals. These inclusions provide steel with the strength and other properties that are well known. As this relates to EC, iron is released in ionic form, but so too are the other metals and carbon inclusions as the iron in the steel corrodes. As such, the mass of steel lost with the sacrificed electrode is much greater than the mass loss when more pure metal, for example zero-valent iron (ZVI) is used to provide required reactive iron.

In a preferred embodiment, the system described herein applies EC using DC power with sacrificial aluminum and steel (that contains iron) electrodes to corrode iron from its mass as with conventional EC treatment, however the use of cavitation (both inertial and non-inertial) with targets of ZVI elevate the level of iron used in the treatment of acidity, but also due to the erosion it causes, and increases the rate of acidity treatment.

The amount of iron and reactive surface area provided by the present system couples EC corrosion with cavitation corrosion and erosion where iron reactants are quickly delivered to water for acidity treatment, but also provides many small reactive surface sites. As a result, acidity treatment and heavy metal coagulation-flocculation is expedited to allow for continuous flow treatment at small to large flow rates while minimizing treatment system size, electrode surface areas, and the amount of electric power required to put the same amount of reactive iron into the acid treatment reaction.

The inclusion of EC with concomitantly with two forms of cavitation is important in that the electric field provided by EC is controllable per Faraday's Law using dedicated power supply control units. Also, and unlike cavitation, EC beneficially contributes molecular and ionic interaction by electrochemically putting very small charged ions and particles in motion thus increasing the rate at which floc-containing heavy metals coagulate to larger particles during maturation where precipitates and flocs consolidate and densify for effective separation from processed water.

Further, when excess electric power is delivered by EC in a Cav/EC reactor, that energy is converted to heat. While heat does accelerate chemical reaction activity and is often a favorable product of the system described herein, heat generated from electric power is costly. Inertial cavitation on the other hand, generates heat as a result of violently collapsing bubbles by pump pressure delivering fluid via a CavNoz at much lower cost. The use of electric power in EC and in acoustic cavitation components of the disclosed system can be easily controlled to optimize each of their performances for combined corrosion affect, and where EC can be limited to provide electron (vs. heat) to electrochemically and necessarily destabilize particle charges that otherwise compromise coagulation-flocculation activity.

Oxidation/Reduction Cell

The technology described herein includes the use of one or more oxidation/reduction electrolytic cells. These units preferably are configured with dimensionally stable electrodes such as graphite, stainless steel, tungsten, or boron-doped diamond materials. Depending upon the polarity in which DC is applied and the supplied power, these cells will cause oxidation or reduction influences on water and its constituents to create oxidants or reductants. Standard volt potentials of various chemicals dictate the over/under potential for a given application that can be optimized during treatability studies required for the often-competing broad-spectrum of constituents in AMD, or the lie. This component is important to the disclosed system as the oxidants (and reductants) that can be generated will greatly influence the reactions of the process related to acidity as well as non-reactive metals such as manganese when present in non-reactive ionic states. Other metal examples where ionic state drives their solubility and/or ability to be adsorbed include chromium, arsenic, selenium, and especially iron, but also other multi-valent metal species that respond favorably. Sulfate is also responsive to the oxidation/reduction cell. The cell will facilitate the generation of persulfate and persulfate radicals that are powerful oxidants and will then attack bacteria, degrade or destroy organic material, and otherwise breakdown stable complexes. While not necessarily common to AMD, cyanide is common within the mining industry. The cell and the oxidants it can manufacture onsite will destroy this constituent and generate nitrogen and carbon dioxide. As also disclosed in the equations herein, hydrogen peroxide plays an important role in the reactions of the disclosed technology. While this reactant is created by cavitation bubble collapse, the cell will augment the production of that reactant from water, but also generate other oxidants from water such as ozone and most importantly, the cell enhances the reaction rate for treatment of acidity. Hydroxyl radicals and their then formed hydrogen peroxide accelerate the oxidation of ZVI to $Fe^{+2}$, and H+ will be reduced to hydrogen gas. With the loss of H+ in the system, acidity is thus treated.

Targets and Electrode Materials

The technology described herein includes use of targets and electrodes that participate in the active treatment of water and aqueous fluids. In these embodiments, such materials are considered sacrificial in that the mass of the material in their particular forms is lost or released to the fluid being treated. Examples of these types of material include: steel; iron (including zero-valent iron—ZVI); aluminum; graphite; graphene; activated carbon.

Sacrificial materials as provided in their installed state are lost to the fluid being treated as a result of: inertial and non-inertial cavitation erosion and to a lesser degree cavitation corrosion; abrasion; electrolysis; oxidation; and chemical corrosion for the most part.

As embodied, material targets are impacted primarily by cavitation erosion sourced from cavitation nozzles where small particles of material are eroded. Targets of the technology described herein can be granular in nature as in the reaction moving-media chamber feed with a Cav/Noz; as separate purposefully positioned plates or geometric shapes within in various Cav/EC reactor designs; or actual electrodes that are also installed within the Cav/EC reactor chamber as strips, helical "augers", plates, or the like. Importantly, targets need to be able to release small particles that can contribute to the reactions of the disclosed technology either by providing reaction sites to enhance chemical reaction rates or participate in the reaction because of their chemical composition being critical as a consumed/chemically altered reactant. While catalysts may fall in this category, they typically do not because of their prohibitive cost and the fact that they are not chemically consumed. Graphite and graphene may not be consumed, but because of cost, they may provide important practical benefit to reactions of the disclosed technology and can be used accordingly.

Target materials are also beneficially lost to water due to abrasion when materials are exposed to robust and harsh particle-to-particle contact in an intimate manner where material particles are reduced in size. An example of this is the use of a target material such as ZVI granules or pieces of iron flake within an active tri-axial tumbler when used for fluid contact with a moving media of the disclosed water treatment system.

When electrodes are composed of targetable material, they are preferably exposed only to non-inertial cavitation to minimize erosion such as surface cleaning that is achieved to enhance electrolytic reactions that drive sacrificial material from the electrode surface in conjunction with the principles such as Faraday's Law that apply to the most cost effective and reaction efficient use of the electro-chemical processes of electrocoagulation. In this manner, but while sacrificial electrodes made from these materials, their life expectancy and contributions to process reactions are maximized. While acoustic and mechanical cavitation will both impact these materials in some Cav/EC reactors, target placement vs. electrode placement can be flexible to maximize their overall material loss in a cost-effective and reaction efficient manner. Further, power delivered to acoustic cavitation transducers and electrocoagulation electrodes can be individually controlled to optimized ratios.

Dimensionally stable/non-sacrificial material can also be used as targets as well to deflect cavitation, as an example, but these materials are provided in the disclosed technology to provide reactive surfaces that participate in reactions but are not intended to be lost or consumed. Examples of these materials include: stainless steel, graphite, graphene, titanium, Boron-doped diamond (BDD), tungsten, titanium, ceramic or embedded ceramic, platinum, niobium, or other material and composition exotics that prevalent literature and testing data support their use to achieve a desired end-result with the disclosed technology. While material may be degraded with excess power, such as graphite or graphene, they will functionally support electrochemical reaction where their form is not altered or released. Because of the cost of many of these materials, their exposure to any forms of cavitation may be deleterious to their longevity and intended performance. In these cases, cavitation should be limited or prevented. As shown in some various embodiments of the Figures, these materials are best provided in separate isolated electrode housings or in-line retaining screens (e.g. platinum catalyst) outside of the Cav/EC reactor, or placed where they will receive minimal impact from cavitation.

Electrode Configurations

The technology described herein embodies two (2) types of electrode configuration uses. One is used for sacrificial electrodes that are installed within a Cav/EC reaction chamber where they will be primarily used for electrocoagulation processing of water while also being exposed to cavitation. The other electrode component is primarily used for dimensionally stable electrodes that are often two costly for installation within a Cav/EC reactor due to the deleterious effects of cavitation, and because the dimensionally stable electrode materials are not intentionally consumed or converted to other materials by process reactions.

Electrodes must effectively and efficiently conduct electric power as free electrons to drive or enhance various reactions of the present technology's electrodes. Electrodes are arranged as a pair or in pairs where one electrode serves as the cathode and the other as an anode. When in pairs, each pair may be wired to power in parallel with other electrode pairs, or in serial connections. Multiple electrode pairs are preferred for highly contaminated water or larger flow operations where opposing sides of an anode of one electrode pair would form a gap with the cathode of the adjacent electrode pair. This is a common configuration for electrolytic cells in general electrochemical processing as well as electrocoagulation where efficiencies are required with respect to electrode material, geometries of surface area, and importantly, electrode gaps.

Electrode gaps create the space through which water flows and across which electricity is conducted in accordance with Faraday's Law as it applies with respect to the wide range of electrode surface current densities that can be applied within the present technology. As such, the gap between a cathode and an anode relative to the effective surface area of the electrode pair is important.

Many alignment spacings are discussed in the literature and evaluated in research, as well as utilized in full-scale commercial applications of electrocoagulation. Basically, the larger the gap, the greater the resistance created by the water due to the distance electricity, i.e., electrons, must travel. This resistance can be accommodated not only by adjusting electrode spacing, but also by adjusting the conductivity of the fluid being processed with electrolytic salts. Another control method is the selection of electrode material based on its conductivity or electrical resistivity through the volume of the metal of the electrode considering its surface area dimensions and thickness. However, electrode material selection is typically limited based upon the chemistry need to prosecute any desired reaction.

For electrocoagulation electrode cells, the most common electrode gap can range from 3-4 mm to 10-12 mm for most effective results. If the gap is too small, the facing surfaces may foul or scale up creating hot spots that prematurely exhaust electrodes and/or increase overall cell resistance. If the gap is too large, resistance again can be too great and/or surface-based reactions can be compromised, particularly if fluid is near or below turbulent flow velocity for the electrode pair or bundle within the reactor.

The technology described herein uses both strip and plate geometry configurations of sacrificial electrode in most preferred embodiments, typical of common electrolytic cell design. The same electrode gap spacing range of 3-4 mm to 10-12 mm also works well for dimensionally stable electrodes in the disclosed technology, but again, dependent upon the fluid conductivity, electrical resistance of the electrode material, and the desired electrochemical reactions.

However, one embodied electrode assembly illustrated in FIG. 3B includes two (2) helical "auger" type electrodes entwined, offset vertically, and rotated along their centerline axis to position the auger flights in parallel to form various electrode gaps. Because of large flow rates this design can accommodate while also causing intense turbulent mixing and centrifugal movement of precipitated solids towards the outer wall of the electrode housing and away from electrode surfaces, a larger electrode spacing was possible. Effective AMD processing was achieved using a conventional gap spacing range as shown in FIG. 3b without fouling or excessive power demand increase to achieve the desired current density, but also at a gap of approximately 50 mm without adverse performance or the need for fluid conductivity enhancement. As the gap increased between electrodes the distance water traveled decreased as a result of the elongated flow path and therefore reduced resistance because of reduced total side wall friction. This, in turn, allowed for an increase in flow rate at a reduce pump feed pressure.

Equations

In the presence of water and oxygen, preferably in a dissolved state, iron corrodes as defined by its oxidation from metallic iron to Iron (II) (Equations 1a and 1b).

$$Fe^0(s) \rightarrow Fe^{+2}(aq) + 2e^- \quad \text{Equation: 1a}$$

$$Fe^0(s) + O_{2(g)} + 2H^+ \rightarrow Fe^{+2}(aq) + H_2O_2(aq) \quad \text{Equation 1b}$$

The released electrons react readily with hydrogen ions from the acidity in the water and dissolved oxygen to form water (Equation 2).

$$4e^- + 4H^+(aq) + O_2(aq) \rightarrow 2H_2O(l) \quad \text{Equation 2}$$

While high levels of acidity are present, the electrons will be consumed by hydrogen ions that are reduced to form hydrogen gas (Equation 3).

$$2H^+(aq) + 2e^- \rightarrow H_2(g) \quad \text{Equation 3}$$

As hydrogen ions and electrons are consumed, pH will increase. By removal of hydrogen and other gases from dissolved and gaseous states, and encouraging the reaction of oxygen to corrode iron, the reaction equilibrium of Eq 3 will be predominant, and will be driven to consume more acidity.

Further, water always contains hydroxide ions, albeit at low concentrations in acidic fluids. As hydrogen ions are consumed and no longer available, this results in a drop in their concentration from acidity treatment measured by an elevation in pH. As hydroxide ions increase in concentration relative to hydrogen ion concentration, hydroxides will preferentially react with iron ions without hydrogen ions present to form Iron (II) hydroxide (Equation 4).

$$Fe+2(aq) + 2OH^-(aq) \rightarrow Fe(OH)_2(s) \quad \text{Equation 4}$$

In another reaction, Iron (II) derived from the corrosion of metallic iron reacts with the hydrogen peroxide from Eq. 1b to form Iron (III) hydroxide ions, and powerful oxidant hydroxyl radicals (Equation 4b). This specific solution is often referred to as Fenton's Reagent which can be generated within the reactions and components of the current technology.

$$Fe+2(aq) + H_2O_2(aq) \rightarrow Fe^{+3}(aq) + OH^- + \cdot OH \quad \text{Equation 4b}$$

In another reaction process, oxygen in the water is reduced with the presence of an electron surplus provided by corroding iron, yielding water and hydroxide ions (Equation 5).

$$O_2 + 4e^- + 2H_2O \rightarrow 4OH^- \quad \text{Equation 5}$$

When electrons are not available to react, and Iron (II) ions are present in acidic to neutral pH solution, it further reacts with hydrogen ions liberated from ongoing corrosion of metallic iron ($Fe^0$) and oxygen to form Iron (III) ions and water (Equation 6).

$$4Fe^{+2}(aq) + 4H^+(aq) + O_2(aq) \rightarrow 4Fe^{+3}(aq) + 2H_2O(l) \quad \text{Equation 6}$$

These in turn, form iron oxides (also called hydroxides), in neutral to alkaline solutions with excess hydroxide ions that cause alkaline pH (Equation 7).

$$Fe^{+3}(aq) + 3OH^-(aq) \rightarrow Fe(OH)_3(s) \quad \text{Equation 7}$$

When other constituents are present in the water, such as other cations including heavy metals, they can precipitate as metallic oxides and also absorb into the iron oxides and hydroxides. As the precipitates nucleate and form coagulated solids, they mature increase in size and density due to particle-particle interactions and attractive particle charges, and settle once density overcomes the effects of water density and its flow velocity.

Another reaction that also takes place with iron and water when oxygen is not present yields Iron (II), hydrogen gas, and hydroxide ions (Equation 8)

$$Fe^0(s) + 2H_2O(aq) \rightarrow Fe^{+2}(aq) + H_2(g) + 2OH^-(aq) \quad \text{Equation 8}$$

While similar to the reactions in Equations 1a and 1b where metallic iron is corroded, this reaction is also often attributed to part of a reduction reaction process that reduces sulfate to sulfide where bacteria use the electrons formed during hydrogen formation, but also where ZVI is the electron donor and can also absorb sulfide if present in the water.

In Equation 1, metallic iron, or ZVI is corroded as a result of its oxidation in the presence of water. Cavitation causes both erosion and corrosion of ZVI. ZVI particles eroded from a metallic iron target (plate or media) or electrode by cavitation have extremely high surface area subject to reaction with oxygen or oxidizing conditions. Cavitation also generates hydroxyl radicals that will react to form hydrogen peroxide as result of reactions within collapsing bubbles that will oxidize iron quickly. When this process occurs within a reactor where electrocoagulation is applied, additional oxygen is put into solution by the electrolysis of water.

While the processes and chemistry presented above are extremely simplified, it allows for further understanding of how the water treatment components of the technology described herein treat acidity and remove heavy metals from impacted water. Where iron sourced from ZVI, targets, and/or the iron from steel electrodes is put efficiently into a more reactive state using two forms of cavitation in concert with immediate electrochemical effects of electrocoagulation's contributive coagulation and flocculation, acidity is treated and the subsequent density and particle size separation of resultant metal-containing solids from water occurs.

General Equipment Benefits

In other embodiments, the water treatment system of the disclosed technology can be down-sized to perform laboratory bench top applications where such a device size is suitable for device design and process optimization studies, engineered scaling evaluations, research, and small batch of low flow full-production or micro-production operations.

For larger applications, components can be housed in a small transportable trailer. For permanent system installation, equipment may be prefabricated and housed in a fully contained weather protective shipping container or containers for ease of transport and installation for outside installations or within enclosed areas. System components can be skid-mounted or erected on site within large free-standing structures or with adequate housing component protection at large outdoor sites.

At minimum, the components of the system will require manufacture from materials suitable for component placement during use, exposure to deleterious properties and chemicals of water and aqueous fluids being treated, and general ambient operating conditions. Coatings of internal system component may be appropriate provided they withstand exposure to the conditions within.

Supplemental electrolyte enhancer can be added to increase water conductivity and to favorably affect overpotentials within the reactor thus lowering power demands and increase reaction efficiencies.

Process Monitoring and Control

Figures and description of the systems described herein refer to various installation locations and components of features, devices and instruments that may be desirable to operate and control the disclosed system. These are conventional items common to most all fluid processing systems. However, to provide clarity and assert that the disclosed system is in full support of current monitoring and control methods, as well as those yet to be developed or commercialized, these components may include: pH, ORP, dissolved oxygen, flow, temperature, pressure, ion-specific, turbidity, colorimetric, spectrophotometric, doppler, radiation, viscosity, specific conductivity, gas, water level, and other types of sensors, gauges, automated sampling and analytical instruments, and others that measure or desired analytes or parameters. These may be manual or automated for digital data logic controller interface, actuation of valves, process management, logging, and remote data interface/transfer via servers to cable or the airways to remote locations.

EXAMPLES

Additional aspects of the present technology can be better understood in conjunction with various laboratory, engineering, and on-site pilot studies provided in the following examples that have incorporated various components of the disclosed technology with analytical data provided for system and treatment efficacy.

The data in the following tables present numerous configurations of the components as described, however, they do not reflect detailed process optimization using control variables of the various components, singularly, or as a system in entirety. Importantly, combinations of components embodied in the disclosed system are reflected in the data All analytical data was generated by third party laboratories including: Edge Analytical, Inc. of Burlington, Wash. or Green Analytical Laboratories of Durango, Colo. using USEPA approved methods and quality assurance/quality control procedures for water and wastewater. All samples were collected in appropriately preserved containers, and sample container handling and transfer followed chain-of-custody protocols.

Example 1

TABLE 1

Comparison of Acidity Response to Ultrasonic Transducers by Output Frequencies with and without Electrocoagulation as Measured by pH (S.U.)

| Elapsed Time (mins) | pH (S.U.) | | | | | Cement Creek |
|---|---|---|---|---|---|---|
| | American Mammoth Mine AMD | | | | | |
| | 40 kHz | 68 kH | 170 kHz | 40 + 68 kHz | 40/68 kHz + EC | 40/68 kHz + EC |
| 0:00 | 2.95 | 2.95 | 3.04 | 4.73 | 3.46 | 3.36 |
| 0:05 | | | | | 3.49 | |
| 0:10 | | | | 4.82 | | 4.54 |
| 0:15 | | | 3.01 | | | |
| 0:20 | | 3.07 | | | | 4.9 |
| 0:25 | | | 3.01 | | | |
| 0:30 | | 3.15 | | 5.01 | 4.61 | 5.62 |
| 0:35 | 3.05 | | 3.01 | | | |
| 0:40 | | 3.22 | | | 5.62 | 5.78 |
| 0:44 | | | | | | |
| 0:45 | 3.16 | | 3.01 | 4.96 | | |
| 0:50 | | 3.25 | | | 6.01 | 5.73 |
| 0:55 | 3.24 | | | 4.94 | | |
| 1:00 | | 3.32 | 3.02 | | 5.97 | 5.75 |
| 1:05 | 3.37 | | | 4.96 | | |
| 1:10 | | 3.38 | 3.04 | | 6.00 | 5.82 |
| 1:15 | | | | 4.89 | | |
| 1:20 | 3.64 | 3.45 | 3.04 | | 6.27 | 5.92 |
| 1:25 | 3.83 | | | 4.75 | | |
| 1:30 | | 3.57 | 3.05 | | 6.84 | 5.97 |
| 1:35 | | | | 4.63 | | |
| 1:40 | 4 | 3.63 | 3.06 | | 7.30 | 5.96 |
| 1:45 | | | | 4.58 | | |

TABLE 1-continued

Comparison of Acidity Response to Ultrasonic Transducers by Output Frequencies with and without Electrocoagulation as Measured by pH (S.U.)

| | pH (S.U.) | | | | | |
|---|---|---|---|---|---|---|
| Elapsed | American Mammoth Mine AMD | | | | | Cement Creek |
| Time (mins) | 40 kHz | 68 kH | 170 kHz | 40 + 68 kHz | 40/68 kHz + EC | 40/68 kHz + EC |
| 1:50 | 4.14 | 3.85 | 3.06 | | 7.64 | 5.99 |
| 1:55 | | | | 4.59 | | |
| 2:00 | 4.26 | 3.94 | 3.07 | 4.6 | 8.26 | 6.05 |

Table 1 presents treatability study pH data using acoustic cavitation/electrocoagulation components as described herein to treat acidity as measured by pH over time of treatment. AMD was irradiated with ultrasonic frequencies of 40, 68, and 170 kHz individually, in combinations of frequencies, and concomitantly with electrocoagulation. The intent of the study was to identify appropriate ultrasound frequencies to treat acidity within a practical time frame such that continuous treatment of AMD was possible without being limited to batch modes of processing that would include recycling through the process equipment. AMD used in the study was obtained from the American Mammoth (AM) Mine tunnel near Wallace, ID and from the Cement Creek water from the Bonita Peak Mining District NPL Site near Silverton, Colo.

The Cav/EC reactor used for these series of tests were consistent with the device depicted in FIG. 3A, but without the cavitation nozzle (CavNoz) 23. A five (5) gallon container filled with 4.25 gallons of AMD was treated through the Cav/EC reactor at flow rate of 2.2 gpm. Samples were collected from the outlet of the reactor at time intervals indicated and measured for pH with a 2-buffer calibrated pH meter. The capacity of the Cav/EC reactor was approximately two gallons. For ultrasound, two (2) two-channel power supply units delivered 50% of the 500 watt per channel capacity of the unit to each transducer. One supply provided 40 kHz to two (2) transducers, and the other unit suppled 68 kHz to two (2) transducers in a perpendicular cross-fire alignment within reactor.

For the EC components, a steel cathode and an aluminum anode formed the electrode pair mounted within the chamber. During operation, polarity was reversed for 2 minutes after every 10 minutes period of operation. DC power current density to the electrode (3"×17") was consistent with generally reported power levels and in accordance with Faraday's Law and the studies in the literature for electrocoagulation treatment of water for suspended solids and heavy metals. Water from the reactor was returned to the container for continued recirculation and treatment through the reactor. Treatment was performed and acidity monitored over time in this manner for each processing setup with the desire of decreasing treatment duration to an acceptable and practical time frame for continuous flow treatment of acidity and heavy metals.

As shown in Table 1, sonication frequencies of 40, 68, and 170 kHz failed to singularly treat acidity, whereas a combined use of 40 and 68 kHz frequencies did provide some favorable response, although pH was still below desirable pH of 5-5.5 (S.U.). When electrocoagulation (EC) was concomitantly provided with sonication using both 40 and 68 kHz frequency transducers all in the same reactor, a favorable pH level was achieved in slightly less than an hour of recirculation using the American Mammoth AMD. In replicate treatment of acidic Cement Creek water using the same acoustic cavitation from 40 and 68 kHz transducers, and at the same time with electrocoagulation in the same reactor, the results were similar in that a desirable pH of ~5.5 S.U. was comparably achieved in slightly less than an hour of processing. While suitable for batch treatment, the reaction time was not practical for processing a continuously flowing water source without extensive retreatment/recycling loops within treatment equipment as well as expansive water storage capacity.

Example 2

TABLE 2

Active Media: Metallic Granular Metals and % Mass Ratios
Acid Mine Drainage, Summitville Mine NPL Site, Summitville CO

| | | Iron (Zero Valent Iron—ZVI):Aluminum Sample ID | | | | | Steel:Aluminum |
|---|---|---|---|---|---|---|---|
| | Control | 1 | 2 | 3 | 4 | 5 | 6 |
| Time (mins) | No Media | 100:0 | 80:20 | 50:50 | 20:80 | 0:100 | 100:0 |
| | | | | pH (S.U.) | | | |
| 0 | 2.70 | 2.70 | 2.70 | 2.70 | 2.70 | 2.70 | 2.6 |
| 10 | 2.89 | 6.14 | 5.61 | 5.87 | 4.59 | 2.96 | 3.34 |
| 15 | 2.69 | 5.99 | 6.15 | 6.21 | 5.7 | 3.02 | 3.78 |
| 30 | 2.89 | 6.41 | 6.39 | 6.32 | 6.27 | 3.09 | 4.48 |
| 60 | 2.82 | 6.42 | 6.29 | 6.37 | 6.31 | 3.2 | 4.55 |
| 120 | 2.67 | 6.87 | 6.57 | 6.00 | 6.42 | 3.37 | 4.71 |

Table 2 presents AMD pH study results performed using only granular iron (zero valent iron—ZVI), steel grindings, and metallic aluminum singularly and in various ratio blends. No other components of the disclosed system were included in this study. The study intent was in efforts to identify a means to shorten overall reaction time when cavitation/electrocoagulation treatment require prolonged process times. This media contact component process step was integrated when lab studies showed that while cavitation/electrocoagulation often generated treated water of adequate end-product quality, the cavitation/EC processing duration alone was often too long and that in these cases the system without this media step would lose practical functionality due to process times that could exceed 1-1.5 hours.

As evidenced in the data of Table 2, Sample ID 1, ZVI effectively elevated pH to an appropriate level of 6.0 S.U. in a time frame of 10 minutes, whereas blends of iron with aluminum, and aluminum and steel alone, failed to achieve a similar pH results of at least 6.0 S.U in that same 8-10 minute duration. As also shown in other examples presented herein, cavitation/electrocoagulation alone does generate acceptable acidity levels without the need for ZVI but with unacceptable extended treatment times being required. However, using only ZVI media, efficient acidity treatment was achieved within a practical and acceptable time frame. Coupling ZVI media contact with cavitation/electrocoagulation provides mutual benefits, but in particular, a shortened reaction time It is also noted that the technology described herein utilizes ZVI, but also accommodates other forms of granular media as desired by their contribution to reactions. As shown in Sample ID #2, an 80:20 (wt.) blend of ZVI and granular aluminum is effective at treating acidity. Properly conducted treatability studies will allow those who may implement this art to ascertain the best media for any given application based on media cost, acidity treatment performance, media treated water influences on subsequent components of the disclosed system, and related costs, both for capital equipment, and operating expenditures over the life-cycle of a treatment system. As evidenced by the data of Table 2, the ZVI media contact with AMD adequately treats acidity, but it does not adequately remove heavy metals.

One other important finding in this example are the results comparing ZVI in Sample 1 with those of steel in Sample 6 for acidity treatment, noting that ZVI was effective and steel was not. ZVI is, for practical purposes, nearly 100% iron. Steel on the other hand, has inclusions of carbon and other metals within its structure, thus reducing the amount of iron available when compared to ZVI on a mass to mass basis. The inclusions in steel help create the strength and internal structural properties for which its conventional use requires. In water treatment and in particular in the present technology iron (Fe) is necessary and the inclusions of steel do not necessarily enhance the reactions required of this technology described herein. One other important distinction between ZVI and steel is that ZVI, and particularly if it is preferably provided as iron flake, is soft and brittle with voids and cracks that create significantly more reactive surfaces that steel that is smooth, strong, hard, and has essentially no pore space on a comparable basis. As such, it is important to note that when iron is referenced in this disclosure, it is a term being used for steel that is available in numerous grades of quality. Where iron (Fe) is important, it will be referred to as zero-valent iron (ZVI for $Fe^0$).

Mine. The media contact reactor was equivalent to a single unit depicted in FIG. 2A. The retention contact time from Table 2 of 10 minutes was replicated, but also bracketed for shorter and longer contact times to determine if extended or lessor durations were possible or required with respect to not only acidity treatment, but also relative to treatment of heavy metals in the source acid mine drainage.

Sample run 4 consisted of a ten (10) minute contact time, achieved an acceptable pH to reduce treatment demand of cavitation/electrocoagulation, and lowered concentrations of aluminum, copper, and lead. These metal removals achieved with shorter contact durations were likely the result of adsorption by ZVI. However, it is clear that no study run, whether of short or long duration, resulted in adequate treatment of both acidity and removal of all heavy metals using only ZVI. The twenty (20) minute contact time caused significant elevation in total iron, but generated significant reductions in cadmium, copper, and lead. While iron concentration fluctuations across the study were likely caused by oxidation/reduction reactions of ZVI to soluble Fe(II) and/or less soluble Fe(III) at the achieved pH and related to electron transfer and reaction with hydronium ions and hydroxyl radicals. Table 2 clearly presents the favorable treatment of acidity to the disclosed technology, but also shows that ZVI alone cannot adequately remove all critical heavy metals from acid mine drainage to acceptable levels. Only cadmium and lead were treated to near trace μg/L concentration level desired objective for discharge to aquatic water under chronic and acute discharge limits in two of the runs.

Optimized treatability studies using the technology described herein will identify water quality and cost information data to determine if a media contact period of less than ten (10) minutes will be sufficient to treat acidity and still allow for efficient subsequent treatment by cavitation/electrocoagulation. It is noted that in simple terms, acidity increases logarithmically with respect to each decrease in pH S.U., that is, a fluid with a pH of 4.0 has 10 times more acidity than a fluid with a pH of 5.0, and 100 times more acidity than a fluid with a pH of 6.0 where acidity is based on the concentration of hydrogen ions in solution. As acidity increases, its demand on cavitation/electrocoagulation's capacity increases as well and causes issues with respect to heavy metal removal. The use of ZVI clearly reduces the demand that would be placed on electrocoagulation to treat Example 3

TABLE 3

AMD Media Column Study (100% ZVI) for Heavy Metals
Add Mine Drainage, Summitville Mine NPL Site, Summitville CO

| Parameter | Units | Untreated | Treatability Sample Runs | | | | |
| --- | --- | --- | --- | --- | --- | --- | --- |
| | | | 1 | 2 | 3 | 4 | 5 |
| Time | Mins | 0 | 1 | 2 | 5 | 10 | 20 |
| pH | S.U. | 2.89 | 3.36 | 4.21 | 4.24 | 6.02 | 6.13 |
| Al | μg/L | 110,000 | 121,000 | 118,000 | 14,500 | 8,800 | 2,960 |
| Cd | μg/L | 100 | 83 | 66 | 2 | 19 | 1 |
| Cu | μg/L | 29,540 | 9,730 | 66 | 2,590 | 952 | 41 |
| Fe | μg/L | 94,900 | 275,000 | 353,000 | 588,000 | 376,000 | 758,000 |
| Pb | μg/L | 141 | 41 | 19.0 | 1 | 7.0 | 1 |
| Mn | μg/L | 25,700 | 26,600 | 27,000 | 25,000 | 23,700 | 25,500 |
| Zn | μg/L | 14,310 | 16,690 | 16,700 | 8,190 | 4,351 | 2,770 |

Table 3 presents water quality heavy metal data from a lab-scale media contact reactor containing ZVI as identified in the previous table using the same AMD from Summitville acidity. The ability to balance between media use and contact with cavitation/electrocoagulation is an important aspect of the technology described herein and its flexibility, particulary when acidity load is too much for solely cavitation/electrocoagulation alone.

Examples 4-6

Tables 4, 5, and 6 present data from the treatment of AMD from several mines also using the Cav/EC reactor presented in FIG. 3A, with one exception being the position of the CavNoz 23. The discussion for the studies related to these tables, below, indicates where the CavNoz was included as part of the process setup.

Example 4

TABLE 4

Kellogg Tunnel AMD, Bunker Mine, Kellogg ID

| Parameter | Units | Untreated | R-1 | R-1 |
|---|---|---|---|---|
| Aluminum | mg/L | 1.27 | 0.893 | 0.19 |
| Arsenic | mg/L | 0.040 | <0.0030 | 0.0004 |
| Cadmium | mg/L | 0.0750 | 0.0492 | 0.021 |
| Copper | mg/L | 0.0600 | 0.0107 | 0.0014 |
| Iron | mg/L | 88.6 | 44.9 | 1.98 |
| Lead | mg/L | 0.607 | 0.00535 | 0.00086 |
| Manganese | mg/L | 68.8 | 60.5 | 48.04 |
| Nickel | mg/L | 0.059 | 0.165 | 0.025 |
| Sulfate | mg/L | 1430 | NT | 858 |
| Zinc | mg/L | 50.2 | 15.1 | 2.296 |
| pH | S.U. | 2.34 | 6.74 | 7.54 |

Table 4 presents two (2) treatments of AMD from the Kellogg Tunnel of the Bunker Mine in Kellogg, Id. Each treatment regime was performed separately and independent of the other. Both treatments were performed using the same protocols and setup as discussed previously in the examples of Table 1 with the following exceptions: Regime R-1 was processed using 50% of the capacity of each ultrasonic power supply controller until at field pH of 6.5 (S.U.) was achieved. Regime R-2 was processed at 100% of the power capacities until a field pH of 7.5 was reached. Fluids from both treatments were allowed to rest while solids resultant from coagulation were allowed to mature and settle. Supernate for each regime was subsequently sampled and analyzed for pH and collected for metals analyses as totals. The pH reported in the table is that of the clarified supernate. No filtration step was performed as part of the treatment process, and no samples were filtered by the laboratory as part of the analyses. It was observed during the system tear-down and cleaning before, between and after the treatment runs of this study that some cavitation erosion was evidenced by pitting of the electrode surfaces exposed to the acoustic transducers, and with more pronounced pitting noted after Regime 2.

With respect to the metal results, all metals were removed to acceptable levels, except for manganese and zinc in R-1. While iron was elevated, it was still below an acceptable level. The results from R-2 were much improved with respect to these parameters, and in particular, zinc was below the treatment objective. Manganese was not adequately treated in either regime, however its reduced concentration in R-2 was likely attributable to the elevated pH of the treated water as well as increased cavitation that increased concentrations of hydroxyl radicals to oxidize manganese to its less soluble state for precipitation with other solids. Cavitation eroded particles would have also provided more surface area for it to adsorb, however the acoustic cavitation provided still may not have generated adequate reactive surface area from limited cavitation erosion, or generated adequate hydroxyl radicals to effect adequate manganese oxidation.

The disclosed technology as applied in this example in R-2 also resulted in a lower sulfate concentration, presumably as a result of reduction with ZVI and related ionic forms of iron, and the formation of insoluble iron and/or other metallic sulfides at near neutral pH, whereas in acidic conditions, sulfide would likely be oxidized to sulfate, or liberated as hydrogen sulfide.

Example 5

TABLE 5

Success Mine AMD, Wallace ID

| Parameter | Units | Untreated | Regime 1 | Regime 2 | Regime 3 |
|---|---|---|---|---|---|
| Aluminum | mg/L | 3.5 | 0.279 | 0.104 | 0.18 |
| Cadmium | mg/L | 0.0554 | <0.005 | <0.005 | <0.005 |
| Copper | mg/L | 0.187 | 0.026 | 0.018 | <0.005 |
| Iron | mg/L | 25.5 | 1.86 | 0.797 | 25.8 |
| Lead | mg/L | 0.251 | <0.00025 | <0.00025 | <0.00025 |
| Manganese | mg/L | 28.1 | 4.28 | 4.09 | 9.99 |
| Zinc | mg/L | 32.1 | 0.189 | 0.135 | 1.35 |
| pH | S.U. | 5.86 | 6.19 | 6.82 | 6.21 |

The same study protocol was performed in the lab on AMD from the Success Mine near Wallace, Id. Regimes 1 and 2 were operated with full ultrasonic power applied to the transducers, and Regime 3 was run at 50% power. Samples were pulled at pH levels of 6 and 6.5 for Regimes 1 and 2, and at 6 for Regime 3. While the data suggests that pH is not necessarily a controlling factor for iron, manganese, and zinc removal by the technology, the data does indicate that the influence of enhanced acoustic cavitation is significant to all of these metals, whether the results are in response to increased oxidation, mixing, an increase in ZVI particle presence in the water from particle erosion, or elevated levels of reactive iron, or a combination of each provided by the technology. As such, study regimes R-1 and R-2 demonstrated the effectiveness of reducing multiple heavy metal concentrations from AMD as well as treating acidity to near neutral conditions, and that enhancing acoustic cavitation coupled with electrocoagulation improved results.

Example 6

TABLE 6

Cement Creek Water Bonita Peak Mining District NPL Site Silverton (Gladstone), CO

| Parameter | Units | Untreated | Treated |
|---|---|---|---|
| Aluminum | mg/L | 12.7 | 1.29 |
| Arsenic | mg/L | 0.0027 | 0.0003 |
| Cadmium | mg/L | 0.0397 | 0.002 |
| Copper | mg/L | 1.83 | 0.03 |
| Iron | mg/L | 20.6 | 0.23 |
| Lead | mg/L | 0.0661 | 0.0002 |
| Manganese | mg/L | 19.5 | 1.42 |
| Nickel | mg/L | 0.0432 | 0.003 |
| Zinc | mg/L | 8.86 | 0.009 |
| pH | S.U | 3.19 | 7.83 |

Table 6 presents data from the treatment of acidic Cement Creek water obtained upstream of the confluence the Gold King Mine's AMD discharge location above Silverton, Colo. within the Bonita Peak Mining District NPL Site. All equipment and processing remained the same as other treatments and testing performed in Table 4 and 5. For this study however, the inlet CavNoz 23 of the Cav/EC reactor depicted on FIG. 3A was utilized in concert with both acoustic cavitation transducer frequencies coupled with electrocoagulation in the same reactor. Acoustic power supplied to the transducers was at 50% of the 500 watt per channel of each of the 2-channel power supply controllers.

The results indicate that all metals were reduced in concentration using the technology described herein where two (2) types of cavitation were applied in concert with electrocoagulation, all within the same reactor.

Example 7

As a replicate study to evaluate the technology described herein on AMD from another source, the same study methods, procedures, and equipment configuration as that in the example of Table 6, AMD was sourced from the Mogul Mine located upstream from the sample location of Cement Creek. The results are presented in Table 7

TABLE 7

Mogul Mine AMD Bonita Peak Mining District
NPL Site Silverton (Gladstone), CO

| Parameter | Units | Untreated | Treated |
|---|---|---|---|
| Aluminum | mg/L | 3.34 | 3.32 |
| Arsenic | mg/L | <0.0025 | <0.0005 |
| Cadmium | mg/L | 0.0573 | <0.0001 |
| Copper | mg/L | 0.0197 | 0.0087 |
| Iron | mg/L | 11.2 | 0.574 |
| Lead | mg/L | 0.253 | 0.0007 |
| Manganese | mg/L | 26.2 | 0.27 |
| Nickel | mg/L | 0.0216 | 0.0105 |
| Silver | mg/L | <0.0005 | <0.0001 |
| Zinc | mg/L | 32.1 | 0.0255 |
| pH | S.U. | 3.46 | 6.48 |

As with the treatment of acidic Cement Creek water, all metals were reduced in concentration and acidity was treated to an end pH of 6.48 S.U. The system utilized the Cav/EC reactor of FIG. 3A with the Cav/Noz installed on its inlet. Major differences between the water treated in the example of Table 6 and the water of this example are variations in heavy metal concentrations, notably zinc, and other water characteristics. Table 6 water was from a flowing stream and Table 7 water was AMD flowing directly from an abandoned legacy mine. Despite these differences, the technology described herein effectively reduced heavy metal concentrations and treated acidity to a near neutral level in both.

Example 8

TABLE 8

| Gold King Mine AMD Bonita Peak Mining District NPL Site Silverton (Gladstone), CO | | | | | | |
|---|---|---|---|---|---|---|
| Parameter | Units | Untreated | R-1 | R-1A | R-2 | R-3 |
| Aluminum | mg/ | 13.9 | 1.43 | 1.39 | NT | NT |
| Arsenic | mg/L | 53 | NT | NT | 0.0004 | 0.00035 |
| Cadmium | mg/L | 0.0379 | 0.0285 | 0.0017 | 0.0012 | <0.00025 |
| Copper | mg/L | 2.96 | 0.114 | <0.0100 | 0.008 | 0.002 |
| Iron | mg/L | 58.5 | 5.58 | <0.500 | 23.54 | 2.05 |
| Lead | mg/L | 0.0193 | <0.0050 | <0.0050 | 0.00017 | 0.0017 |
| Magnesium | mg/L | 17.7 | 16.4 | 13.4 | 7.4 | 2.8 |
| Manganese | mg/L | 21.5 | 18.2 | 5.53 | 7.762 | 0.303 |
| Sulfate | mg/L | 1685 | 983 | 811 | NT | NT |
| Zinc | mg/L | 21.5 | 5.54 | <0.100 | 0.038 | 0.019 |
| pH | S.U. | 3.28 | 5.75 | 7.66 | 6.62 | 7.24 |

Data presented in Table 8 provides additional examples of the technology described herein, but where efforts were taken to enhance performance such that the entire water treatment process of the disclosed technology could be applied to a continuous flow of water without recirculation treatment through process equipment. For this study, AMD from the Gold King Mine within the Bonita Peak Mining District NPL site near Silverton, Colo. was utilized. pH data presented in the Table 8 was obtained from supernate water collected after solids had been separated. pH results mentioned below were obtained directly from the system outlet prior to solids maturation, settling, and decanting.

For equipment, the Cav/EC reactor of FIG. 3A was utilized with CavNoz 23. The overall system was configured in accordance with the system depicted in FIGS. 1A, 1B and 1D but without solids dewatering and as discussed below.

The process utilized in R-1 included the Cav/EC reactor fed with a Cav/Noz and was used to treat water in a system configured as in FIG. 1A until a pH of 6 was obtained. Fluid was then transferred to a separation column for solids maturation and settling. R-1A followed the same system configuration but was operated on AMD until a pH of 6.5 was achieved. R-2 followed the configuration of 1B. The Cav/Noz was not utilized, however an up-flow media reactor filled with ZVI was used to treat water prior to its transfer to the Cav/EC reactor. This treatment run was operated for only 15 minutes when the pH elevated quickly to 6.8. Actual AMD retention time within the media reactor was only 7-8 minutes, based on the 0.27 cubic feet of the ZVI bed-volume used, the 4.5 gallons of AMD processed, and a pumping rate of 1.75 gpm for this test. R-3 was setup and operated in the same manner as R-2, however a Cav/Noz was installed to feed the Cav/EC reactor.

Table 8 results show that all configurations lowered the concentrations of metals from the untreated levels of AMD and lowered sulfate concentrations. However, R-1 did not meet the near neutral pH desired likely contributing to the manganese that was present. R-1A produced better results for all parameters, including pH. R-2 resulted in an increase in iron from the R-1 treatment runs, likely due to overdosing of iron from the media and/or its incomplete oxidation to less soluble Fe(III) state versus that of Fe(II). R-3 resulted in acceptable concentrations for all metals and pH.

From the data, it is evident that Regimes R-1A and R-3 resulted in the best water quality outcome. R-1A treatment included two (2) types of cavitation (mechanical and acoustic) in the presence of EC in the cavitation/electrocoagulation (Cav/EC) reactor. R-3 provided the same components but with ZVI as a reactive media prior to combined cavitation/electrocoagulation processing. R-2 results show a high level of iron, although it was less than half of the total iron in untreated AMD. Magnesium was significantly reduced in both R-2 and R-3, and while sulfate was not analyzed in R-2 or R-3 treated water, it was reduced by over 40% in R-1 and over 50% in R-1A.

In summary of the study results in Table 8, the embodiments of the technology described herein that subjected AMD containing heavy metals and other constituents, including sulfate and magnesium, to reactive ZVI media contact, and mechanical and acoustic cavitation in the presence of electrocoagulation in the same reactor with solids separation by only gravity settling without filtration effectively produced desired treatment outcomes for problematic heavy metals and pH. Further, the addition of the media enhanced treatment performance by reducing process time with the process of the technology described herein being optimizable to various constituents.

Example 9 prolonged treatment period, the media reactor shown on FIG. 2B was available for insertion in the process. The Cav/EC reactor depicted in FIGS. 3C, 3D, and 3E was provided to meet the production higher flow rate, as well as to evaluate whether performance of the disclosed system could be enhanced with scale-up for smaller components. A towable 45 KW generator provided power for the treatment system, the work area, night lighting, and heat in the treatment area of the 2-tn truck during the pilot.

The field trial data presented in Table 9 reflect water quality at the end of a given treatment run, Trials 1-3 were performed at a feed flow rate of approximately 5-6 gpm to allow for operating and process control learning curves. These trials were also used to observe apparent water quality, pH, and other field measurable parameters such as specific conductance, dissolved oxygen, and oxidation/reduction potential. Trials 4-6 were conducted at 10-12 gpm.

No filtration was performed. All water from the Cav/EC reactor was discharged into a settling tank for subsequent return to the influent retention pond at the Gold King Mine site. Water for analytical sampling purposes was collected directly from the system outlet in 4-liter settling columns. These columns of water and solids were allowed to rest for approximately 1 hour for solids maturation and settling. Supernate was then decanted, grab sampled, and transferred to sample containers for offsite analyses,

TABLE 9

Pilot-Scale Field Trial
Gold King Mine AMD, Bonita Peak Mining District NPL Site, Gladstone, Colorado

| | Field Trial No. | | | | | | |
|---|---|---|---|---|---|---|---|
| | Control | 1 | 2 | 3 | 4 | 5 | 6 |
| | | | | Flow Rate (gpm) | | | |
| Parameters (mg/L) | 0 | 5 | 5 | 6 | 10 | 12 | 12 |
| Aluminum | 45.5 | 26.1 | 6.4 | 12.8 | 1.59 | 1.30 | <0.046 |
| Iron | 174 | 61.7 | 41.8 | 28.5 | 58 | 63 | 13.1 |
| Cadmium | 0.113 | 0.074 | 0.071 | 0.073 | 0.069 | 0.067 | 0.0122 |
| Cobalt | 0.121 | 0.0882 | 0.0766 | 0.0788 | 0.075 | 0.071 | 0.0395 |
| Copper | 10.5 | 5.84 | 2.00 | 2.97 | 0.349 | 0.240 | 0.084 |
| Lead | 0.055 | 0.024 | <0.018 | <0.018 | <0.018 | <0.018 | <0.0025 |
| Manganese | 30.6 | 30.1 | 30.6 | 29.3 | 28.6 | 29.2 | <0.0100 |
| Nickel | 0.043 | 0.0884 | 0.193 | 0.18 | 0.191 | 0.16 | 0.018 |
| Zinc | 22.7 | 22.22 | 18.8 | 20.2 | 15.1 | 14.4 | 3.62 |
| pH (S.U.) | 2.81 | 4.32 | 3.33 | 4.51 | 4.29 | 4.95 | 6.12 |

From the studies and results of the example presented in Table 8, a pilot study program was conducted onsite at the Gold King Mine at the Bonita Peak Mining District NPL Site in Silverton (Gladstone), Colo. The intent of the pilot trial was to treat acidity, remove heavy metals and process at a steady flow rate of 5-10 gpm without recirculation retreatment within the system or site tankage. Previously, all treatment and testing were performed on 5-gallon samples derived from the various mine sites. Under the pilot design, prolonged processing was desired to better evaluate the technology described herein. The pilot trials were conducted over a period of approximately one week at the end of the NPL sites remediation season when light night time snow and freezing weather conditions prevailed.

For this pilot program, the components of the system described herein were mobilized to the site for system setup configuration in accordance with schematics depicted in FIGS. 1A, 1C, and 1D. Components within these configurations were based on treatment runs that generated the data from Table 8, however with higher flow rates desired over a Trials 1-3 generated water of varying degrees of water quality until system adjustments were able to generate water with a pH of approximately 5.5-6.0 and clear water within a few minutes of settling separation. pH values reported in the data table are those obtained from treated water after settling and separation of solids.

Field Trial 3 generated the highest quality water determinable in the field without actual laboratory data for metals of the low flow runs. The configuration and operating conditions of this trial was used for increasing production to 10 gpm for Trial 4. Trial 5 repeated Trial 4 conditions, however, power to the acoustic cavitation transducers was increased to result in a final pH of slightly over 5.5 at the outlet of the system. For Trial 6, feed pressure to the cavitation nozzle was increased, and power to acoustic cavitation and the EC electrodes remained the same to achieve a pH at the system outlet of 6.5.

The change made for Trial 6 resulted in more mature and densely coagulated solids that settled notably quicker leaving greater water clarity, and likely minimized the amount of dissolved iron in the form of Fe (II) sourced from the EC electrode bundle with an increase in ZVI activity sourced from the cavitation plates. With the increased and more robust cavitation, an increased amount of ZVI entered solution creating more reaction site surface area for acidity treatment. Enhanced pressure on the CavNoz caused increased the bubble swarm intensity. In accordance with the reaction chemistry, collapsing bubbles likely enhanced the generation of hydrogen peroxide and hydroxyl radicals and thus enhanced favorable conditions to oxidize manganese to its more reactive form. Further, as cavitation increased from the Cav/Noz, the bubble swarm hitting the deflector target plate in the lower reaction chamber was observed carrying through into the EC electrode area.

Based on the data from the field pilot trial, the system described herein effectively treated the AMD from the Gold King mine to meet desired pH and heavy metal outcomes. With no evident neutrally buoyant solid fines to compromise effective solid settling outcome, no filtration was required. No additives such as lime, caustic soda, or other alkaline pH agents, or polymer were required. Combined use of mechanical and acoustic cavitation and targets coupled with electrocoagulation in the reactor of the disclosed system met all needs of the project performance requirements.

Example 10

TABLE 10

Comparison of Lime vs. Invention Treated AMD for Dissolved Metals and pH Mogul Mine AMD, Bonita Peak Mining District NPL Site Silverton (Gladstone) CO

| Parameter | Units | Un-treated | Lime Treated pH 7.86 S.U. | Lime Treated pH 10.34 S.U. | Invention Treated pH 7.00 S.U. |
|---|---|---|---|---|---|
| Aluminum | mg/L | 3.5 | 0.05 | 0.17 | 0.06 |
| Arsenic | mg/L | <0.0025 | 0.0004 | 0.0003 | 0.0002 |
| Cadmium | mg/L | 0.054 | 0.031 | <0.00025 | 0.000125 |
| Chromium | mg/L | N/A | <0.001 | <0.001 | N/A |
| Copper | mg/L | 0.0187 | 0.002 | 0.0007 | 0.0013 |
| Iron | mg/L | 25.5 | <0.050 | <0.050 | 0.03 |
| Lead | mg/L | 0.251 | 0.00016 | <0.0005 | 0.00016 |
| Manganese | mg/L | 28.1 | 22.10 | 0.068 | 0.30 |
| Nickel | mg/L | 0.016 | 0.017 | 0.007 | 0.009 |
| Silver | mg/L | 0.00006 J | <0.0002 | <0.0002 | <0.00001 |
| Zinc | mg/L | 32.1 | 8.740 | 0.022 | 0.019 |
| pH | S.U. | 3.46 | 7.86 | 10.34 | 7.00 |

NOTE:
All metals reported are dissolved.

Table 10 presents a comparative treatment between conventional lime and the system described herein. Lime treatment is based upon the low solubility of metallic hydroxides and their ability to precipitate and coagulate for settling. The study was performed to evaluate relatively similar pH. The lime treatment portion of the study used two (2) pH points, one in the neutral range where the present technology performs, and the other where the most metals of a suite contained by AMD are most insoluble. Because that pH is variable based on the metals present, an end-pH of approximately 10.3 S.U. was selected to maximize removal of zinc. The data clearly shows that the system described herein adequately removes heavy metals at a neutral pH. Lime, on the other hand, did not remove many metals at that same comparable neutral pH. The pH had to be increased to over 10 to achieve similar results.

From practicality and cost perspectives, the system described herein generated roughly 30-40% less solids than the 10.34 pH lime study. The technology described herein does not hydrate water into the resultant solids, and it does not contain calcium provided by the lime. This greatly minimizes the dewatering, handling, and disposal costs related to increased bulking of lime-solids' waste mass. The use of lime requires frequent delivery of bulk reagent for storage in silos or other devices. The technology described herein does not use such reagent, although sacrificial electrodes will require servicing every 2-3 months. The technology described herein can be operated remotely and very easily since it relies almost solely on electric power. For the most part, the cavitation of the system described herein also helps to clean electrodes and chambers of the process, thus minimizing the need for operator servicing, whereas lime-based treatment requires labor intensive cleaning, servicing and handling, and specialty equipment to store bulk lime and deliver it in a controlled dosing manner to avoid missing the close tolerance target pH point.

Example 11

TABLE 11

Michigan Electro-Plater Wash/Rinse Water

| Parameter (units) | Un-treated | Re-gime A | Re-gime B | Re-gime C | Re-gime D |
|---|---|---|---|---|---|
| Chromium, hexavalent (mg/L) | 135.6 | NT | NT | NT | NT |
| Chromium, total (mg/L) | 213 | 0.435 | 1.42 | 0.011 | 0.443 |
| Copper, total (mg/L) | 84.0 | 0.818 | 0.395 | 0.018 | 0.295 |
| Nickel, total (mg/L) | 243 | 95 | 3.00 | 0.175 | 48.29 |
| pH (S.U.) | 4.19 | 6.18 | 6.26 | 6.83 | 7.42 |

Table 11 presents the data from another treatment example using the technology described herein. In the study, acidic electro-plating waste wash and rinse water was treated with the process shown in FIG. 1A and the Cav/EC reactor of 3A. Results for heavy metals of concern for the specific plating operation showed that Regime C met all criteria for discharge to the sanitary sewer under pre-treatment requirements imposed by Publicly Owned Treatment Plant (POTW) of less than 1 mg/L for the reported metals, and a pH between 6.0 and 9.0 S.U.

Example 12

TABLE 12

PFAS Viability Groundwater Treatment Study

| | | Untreated | Configuration A | | Configuration B | | Regime A | | Regime B | |
|---|---|---|---|---|---|---|---|---|---|---|
| Perfluorinated Compounds | Acronym | ug/L | ug/L | % Change | ug/L | % Change | ug/L | % Change | ug/L | % Change |
| Perfluorooctanesulfonic acid | PFOS | 300 | 249 | −17.0% | 347 | 15.57% | 152 | −49.3% | 25.9 | −91.4% |
| Perfluorooctanoic Acid | PFOA | 100 | 86.8 | −13.2% | 84.5 | −15.50% | 42.1 | −57.9% | 18.0 | −82.0% |
| Perfluorononanoic Acid | PFNA | <1.6 | <2 | — | <2 | — | <0.4 | — | <0.2 | — |
| Perfluorohexanesulfonic acid | PFHXS | 4.20 | 4.35 | 3.6% | 4.43 | 5.48% | 7.46 | 77.6% | 1.89 | −55.0% |
| Perfluoroheptanoic acid | PFHPA | 7.30 | 5.85 | −19.9% | 5.32 | −27.12% | 6.26 | −14.2% | 4.14 | −43.3% |
| Perfluorobutanesulfonic acid | PFBS | <1.6 | <9 | — | <9 | — | 2.89 | — | 0.574 | — |
| PFAS - SUM | | 411.50 | 346.00 | −15.9% | 441.25 | 7.23% | 210.71 | −48.8% | 50.50 | −87.7% |

Table 12 presents yet another example of the capabilities of the technology described herein. In this study, groundwater from a former tannery was impacted with Polyfluoroalkyl substance (PFAS) telomeres. PFAS chemicals are highly mobile persistent organic compounds that are known and/or suspected of causing severe risk to human health, their ability to bioaccumulate and inability to degrade. In this study, 5 gallons of impacted groundwater was treated using the system described herein. Configurations A and B were used to evaluate the need for the cavitation nozzle and the oxidation/reduction reaction cell. Regimes A and B were configured as illustrated in FIG. 1D without the media chamber and using the Cav/Reactor of FIG. 3A. Regime B replicated Regime C, but both pressure to the CavNoz and power to the oxidation cell were increased by 30% each, and acoustic power was increased to 100% of the power supply to each set of the transducers. After 30 minutes of processing, the water from the system outlet was sampled and analyzed. Regime B demonstrated that over 87% of the identified PFAS telomeres as a cumulative total were destroyed.

The example is important with respect to plating wastewater. As part of electroplating operations, foam is used to control the odors and vapors generated from chromic acid. PFAS containing additive in foam are used for high temperature foam stability, and because of their water interface properties, also provide benefit to the quality of plating results related to plated part drag-out from various plain baths. As such, acidic plating wash and rinse wastewater fluids that contain acidity and heavy metals, may also contain PFAS telomers.

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An aqueous fluid treatment system, comprising:
   a first oxidation/reduction electrolytic cell having a fluid inlet, a fluid outlet, and an electrode pair extending through at least a portion of the oxidation/reduction electrolytic cell, wherein the oxidation/reduction electrolytic cell is configured such that aqueous fluid passing through the oxidation/reduction electrolytic cell passes between the electrode pair;
   a flow through reactive media reactor having a fluid inlet and a fluid outlet, wherein the fluid outlet of the oxidation/reduction electrolytic cell is in fluid communication with the fluid inlet of the flow through reactive media reactor; and
   a cavitation/electrocoagulation reactor having—
      a fluid inlet,
      a fluid outlet,
      a longitudinal chamber between the fluid inlet and the fluid outlet,
      one or more ultrasonic transducers each having an energy-emitting surface facing toward the chamber, a cavitation nozzle configured to receive aqueous fluid from the fluid inlet of the cavitation/electrocoagulation reactor and eject the aqueous fluid into the longitudinal chamber, wherein the one or more ultrasonic transducers are located downstream of the cavitation nozzle, and an electrode pair extending longitudinally through at least a portion of the longitudinal chamber, such that aqueous fluid received by the chamber passes between and around the electrode pair, wherein the fluid outlet of the flow through reactive media reactor is in fluid communication with the fluid inlet of the cavitation/electrocoagulation reactor, and wherein the one or more ultrasonic transducers are affixed to at least one wall of the longitudinal chamber.

2. The aqueous fluid treatment system of claim 1, wherein the flow through reactive media reactor is a flow through reactive stationary media reactor.

3. The aqueous fluid treatment system of claim 1, wherein the flow through reactive media reactor is a flow through reactive moving media reactor.

4. The aqueous fluid treatment system of claim 1, further comprising:
a second oxidation/reduction electrolytic cell having a fluid inlet and a fluid outlet, wherein the fluid outlet of the flow through reactive media reactor is in fluid communication with the fluid inlet of the second oxidation/reduction electrolytic cell and the fluid outlet of the second oxidation/reduction electrolytic cell is in fluid communication with the fluid inlet of the cavitation/electrocoagulation reactor.

5. The aqueous fluid treatment system of claim 1, further comprising:
a separation unit having a fluid inlet, a fluid outlet and a solids outlet;
a third oxidation/reduction electrolytic cell having a fluid inlet and a fluid outlet, wherein the fluid outlet of the separation unit is in fluid communication with the fluid inlet of the third oxidation/reduction electrolytic cell; and
a dewatering unit having a solids inlet, a solid outlet, and a fluid outlet, wherein the solids outlet of the separation unit is in communication with the solids inlet of the dewatering unit.

6. The aqueous fluid treatment system of claim 1, wherein the flow through reactive media reactor comprises a plurality of flow through reactive media reactors configured in series or in parallel.

7. The aqueous fluid treatment system of claim 1, wherein the chamber is a second longitudinal chamber, and wherein the cavitation electrocoagulation reactor comprises
a first horizontal chamber, wherein the second longitudinal chamber is located at a distal end of the first horizontal chamber.

8. The aqueous fluid treatment system of claim 7, further comprising:
one or more target plates arranged within the first horizontal chamber.

9. The aqueous fluid treatment system of claim 7, wherein the cavitation nozzle is aligned horizontally with the first horizontal chamber.

10. The aqueous fluid treatment system of claim 7, wherein the cavitation nozzle is aligned perpendicular to the first horizontal chamber.

11. An aqueous fluid treatment system, comprising:
an oxidation/reduction electrolytic cell having a fluid inlet and a fluid outlet;
a flow through reactive media reactor having a fluid inlet and a fluid outlet, wherein the fluid outlet of the oxidation/reduction electrolytic cell is in fluid communication with the fluid inlet of the flow through reactive media reactor; and
a cavitation/electrocoagulation reactor having a fluid inlet and a fluid outlet, wherein the fluid outlet of the flow through reactive media reactor is in fluid communication with the fluid inlet of the cavitation/electrocoagulation reactor, the cavitation electrocoagulation reactor comprising—
a first longitudinal chamber;
a second longitudinal chamber located upstream of the first longitudinal chamber;
a cavitation nozzle configured to receive aqueous fluid from the fluid inlet of the cavitation/electrocoagulation reactor and eject the aqueous fluid into the first longitudinal chamber;
one or more ultrasonic transducers affixed to the walls of the first longitudinal chamber and located downstream of the cavitation nozzle; and
an electrode pair, wherein both electrodes in the electrode pair extend through the second longitudinal chamber but only one of the electrodes extends into and through the first longitudinal chamber.

12. The aqueous fluid treatment system of claim 11, wherein each electrode in the electrode pair is in the shape of an auger.

13. The aqueous fluid treatment system of claim 12, wherein the auger-shaped electrodes are helically arranged and vertically separated.

14. An aqueous fluid treatment system, comprising:
a flow through reactive media reactor; and
a cavitation electrocoagulation reactor in fluid communication with the media reactor, the cavitation electrocoagulation reactor comprising—
a chamber;
a cavitation nozzle upstream of the chamber and configured to receive aqueous fluid from the media reactor;
an electrode pair extending through at least a portion of the chamber, such that aqueous fluid received by the chamber passes between the electrode pair; and
an ultrasound transducer positioned peripheral to the electrode pair and having an energy-emitting surface facing toward the electrode pair.

15. The aqueous fluid treatment system of claim 14, wherein the cavitation electrocoagulation reactor further comprises power cables configured to provide DC power to the transducer array and enable the array to direct energy toward the electrode pair.

16. The aqueous fluid treatment system of claim 14, wherein the transducer array comprises piezoelectric cells.

17. The aqueous fluid treatment system of claim 14, wherein the cavitation electrocoagulation reactor is configured to remove polyfluoroalkyl substances (PFAS) from aqueous fluid passing through the chamber.

18. An aqueous fluid treatment system, comprising:
a flow through reactive media reactor; and
a cavitation electrocoagulation reactor in fluid communication with the media reactor, the cavitation electrocoagulation reactor comprising—
a chamber;

a cavitation nozzle upstream of the chamber and configured to receive aqueous fluid from the media reactor;
an electrode pair extending through at least a portion of the chamber, such that aqueous fluid received by the chamber passes between the electrode pair, wherein the electrode pair is angled relative to a plane defined by a wall of the chamber and disposed diagonally between opposing corners of the chamber; and
an ultrasound transducer positioned peripheral to the electrode pair and having an energy-emitting surface facing toward the electrode pair.

\* \* \* \* \*